(12) United States Patent
Ergenci et al.

(10) Patent No.: US 9,096,318 B2
(45) Date of Patent: Aug. 4, 2015

(54) UNIT FOR ACCOMMODATION OF MEMBERS OF AN AIRCRAFT CREW

(75) Inventors: Seher Ergenci, Hamburg (DE); Matthias Breuer, Hamburg (DE); Holger Warner, Jork (DE)

(73) Assignee: Airbus Operations GmbH (DE)

( * ) Notice: Subject to any disclaimer, the term of this patent is extended or adjusted under 35 U.S.C. 154(b) by 289 days.

(21) Appl. No.: 13/055,771

(22) PCT Filed: Jul. 29, 2009

(86) PCT No.: PCT/EP2009/059780
§ 371 (c)(1),
(2), (4) Date: Jan. 25, 2011

(87) PCT Pub. No.: WO2010/012753
PCT Pub. Date: Feb. 4, 2010

(65) Prior Publication Data
US 2011/0114789 A1     May 19, 2011

Related U.S. Application Data

(60) Provisional application No. 61/137,362, filed on Jul. 30, 2008.

(30) Foreign Application Priority Data

Jul. 30, 2008 (DE) .......................... 10 2008 035 375

(51) Int. Cl.
*B64D 11/00* (2006.01)
(52) U.S. Cl.
CPC ........ *B64D 11/00* (2013.01); *B64D 2011/0076* (2013.01)

(58) Field of Classification Search
USPC ........................................ 244/118.5; 105/344
See application file for complete search history.

(56) References Cited

U.S. PATENT DOCUMENTS

| | | | | |
|---|---|---|---|---|
| 3,134,109 A | * | 5/1964 | Parsons | .............................. 5/9.1 |
| 3,754,750 A | * | 8/1973 | Sjostrom | ......................... 493/19 |
| 3,877,086 A | * | 4/1975 | Bue et al. | ........................... 5/9.1 |

(Continued)

FOREIGN PATENT DOCUMENTS

| | | |
|---|---|---|
| DE | 102004017078 | 11/2005 |
| DE | 102007009499 A1 | 8/2008 |

(Continued)

*Primary Examiner* — Brian M O'Hara
*Assistant Examiner* — Keith Dixon
(74) *Attorney, Agent, or Firm* — Lerner, David, Littenberg, Krumholz & Mentlik, LLP

(57) ABSTRACT

The application relates to a unit for accommodating at least one member of an aircraft crew, wherein the unit is designed in such a manner that it can be arranged in a crew rest compartment of an aircraft, wherein the unit comprises first means, second means and third means for changing the volume of the unit, wherein the unit comprises: a lying-down facility for crew members, wherein the lying-down facility comprises first means for displacing the lying-down facility, a front panel, wherein the front panel comprises second means for displacing the front panel, and a sidewall, wherein the sidewall comprises third means for displacing the sidewall. Furthermore, the application comprises a crew rest compartment for accommodating at least one crew member, wherein the crew rest compartment is designed to be arranged in an aircraft, wherein the crew rest compartment comprises a unit according to the invention.

13 Claims, 27 Drawing Sheets

(56) References Cited

U.S. PATENT DOCUMENTS

| | | | |
|---|---|---|---|
| 3,898,704 A | 8/1975 | Gallaher et al. | |
| 5,353,452 A * | 10/1994 | Rulis | 5/136 |
| 5,784,836 A * | 7/1998 | Ehrick | 52/79.8 |
| 6,257,523 B1 * | 7/2001 | Olliges | 244/118.5 |
| 6,290,181 B1 * | 9/2001 | Gadd et al. | 244/171.9 |
| 6,305,645 B1 * | 10/2001 | Moore | 244/118.5 |
| 6,464,169 B1 * | 10/2002 | Johnson et al. | 244/118.5 |
| 6,520,451 B1 * | 2/2003 | Moore | 244/118.5 |
| 7,083,145 B2 * | 8/2006 | Mills | 244/118.5 |
| 7,354,018 B2 * | 4/2008 | Saint-Jalmes | 244/118.5 |
| 7,364,119 B2 * | 4/2008 | Sprenger et al. | 244/118.6 |
| 7,389,959 B2 * | 6/2008 | Mills | 244/118.5 |
| 7,585,022 B2 | 9/2009 | Achilles et al. | |
| 7,762,496 B2 * | 7/2010 | Seiersen et al. | 244/118.5 |
| 8,136,762 B2 * | 3/2012 | Gauggel et al. | 244/118.5 |
| 8,152,102 B2 * | 4/2012 | Warner et al. | 244/118.5 |
| 2003/0104907 A1 | 6/2003 | Sankrithi | |
| 2006/0060704 A1 | 3/2006 | Lavie et al. | |
| 2006/0124802 A1 | 6/2006 | Ritts et al. | |

FOREIGN PATENT DOCUMENTS

| | | |
|---|---|---|
| EP | 0368609 A2 | 5/1990 |
| EP | 1106502 A1 | 6/2001 |
| WO | 2005/080196 A1 | 9/2005 |

* cited by examiner

⊙ = stowage cabinet or stowage compartment

◇ = optional (stowage cabinet or stowage compartment)

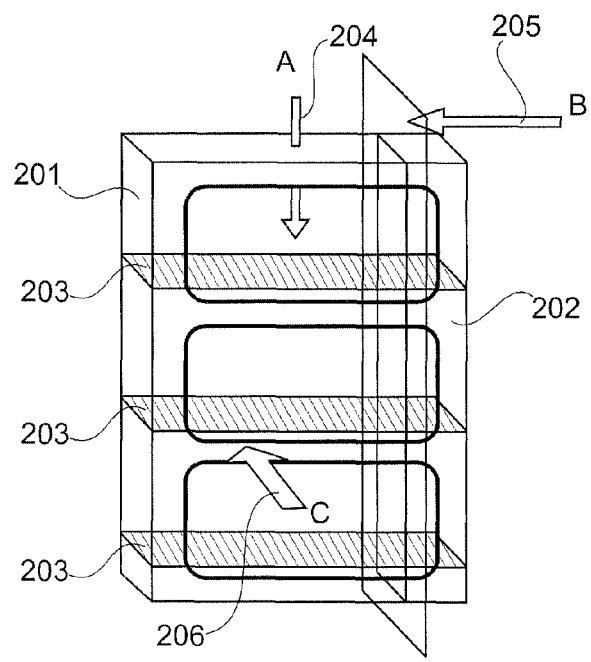
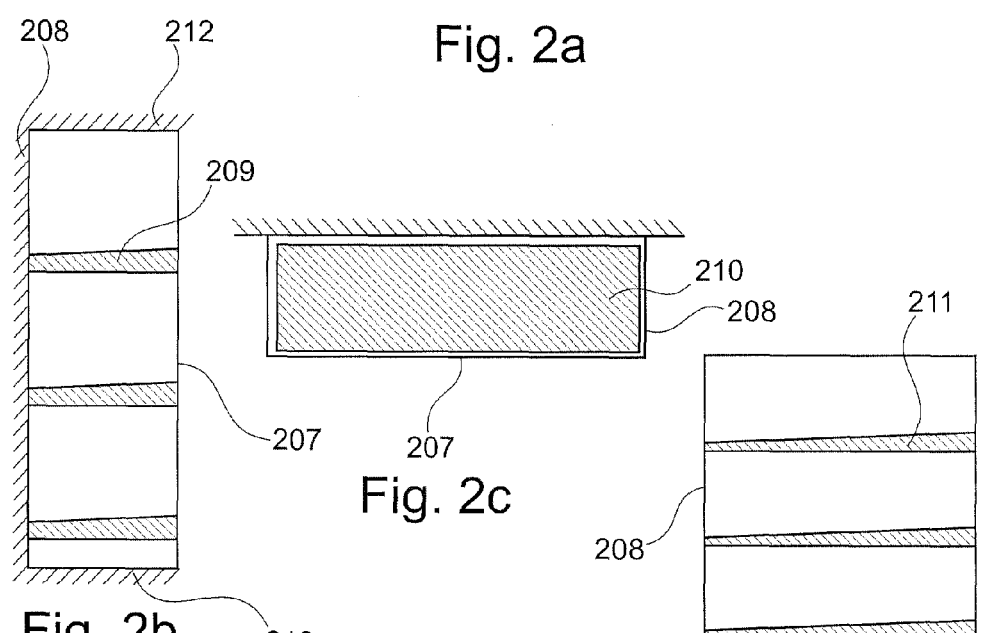
Fig. 2a
Fig. 2b
Fig. 2c
Fig. 2d

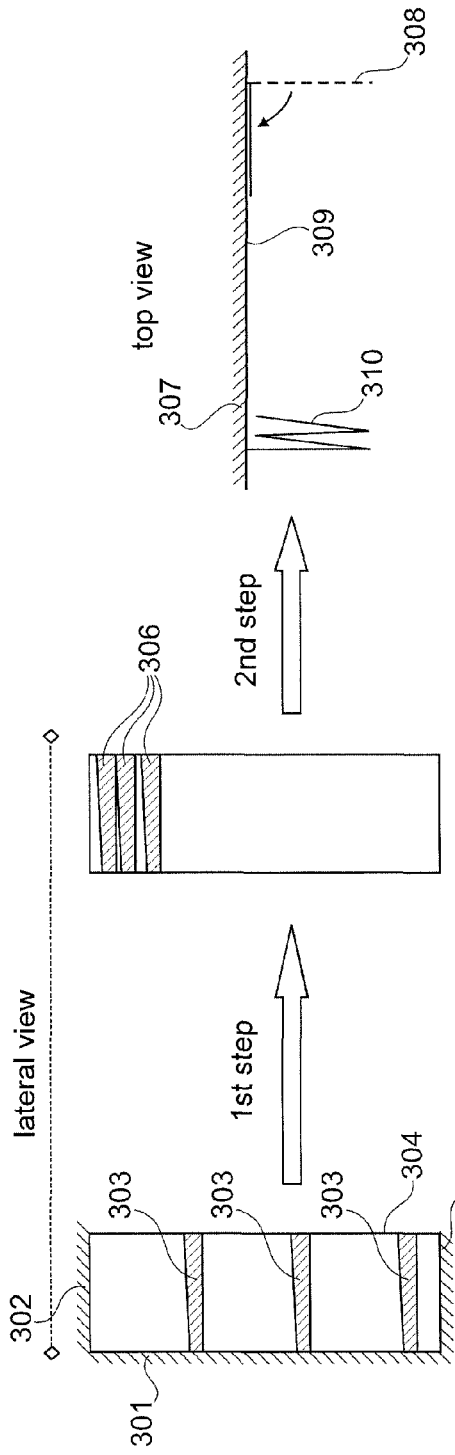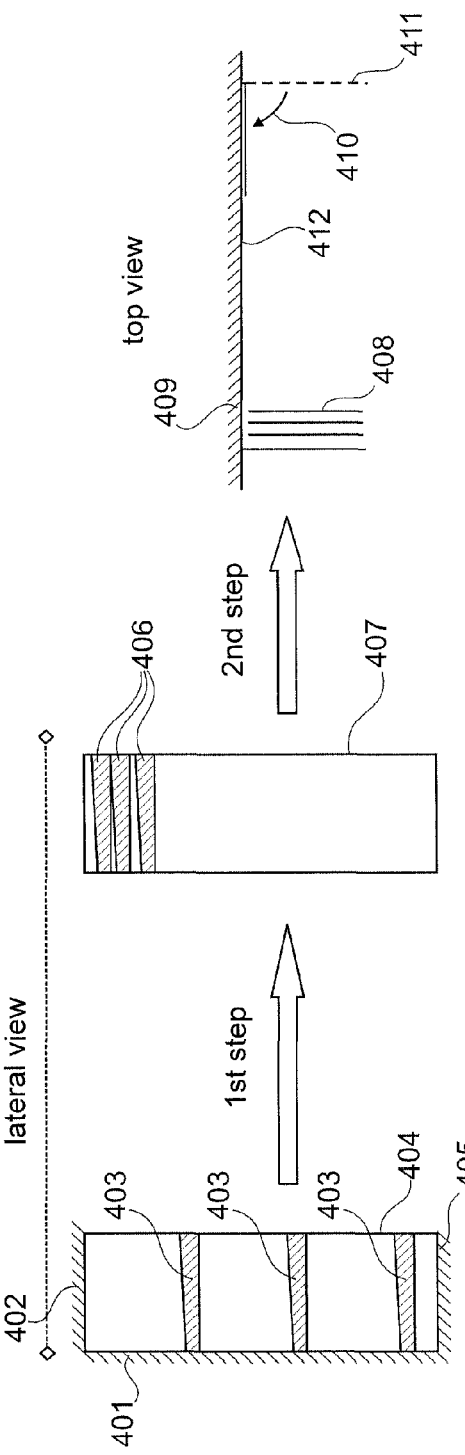

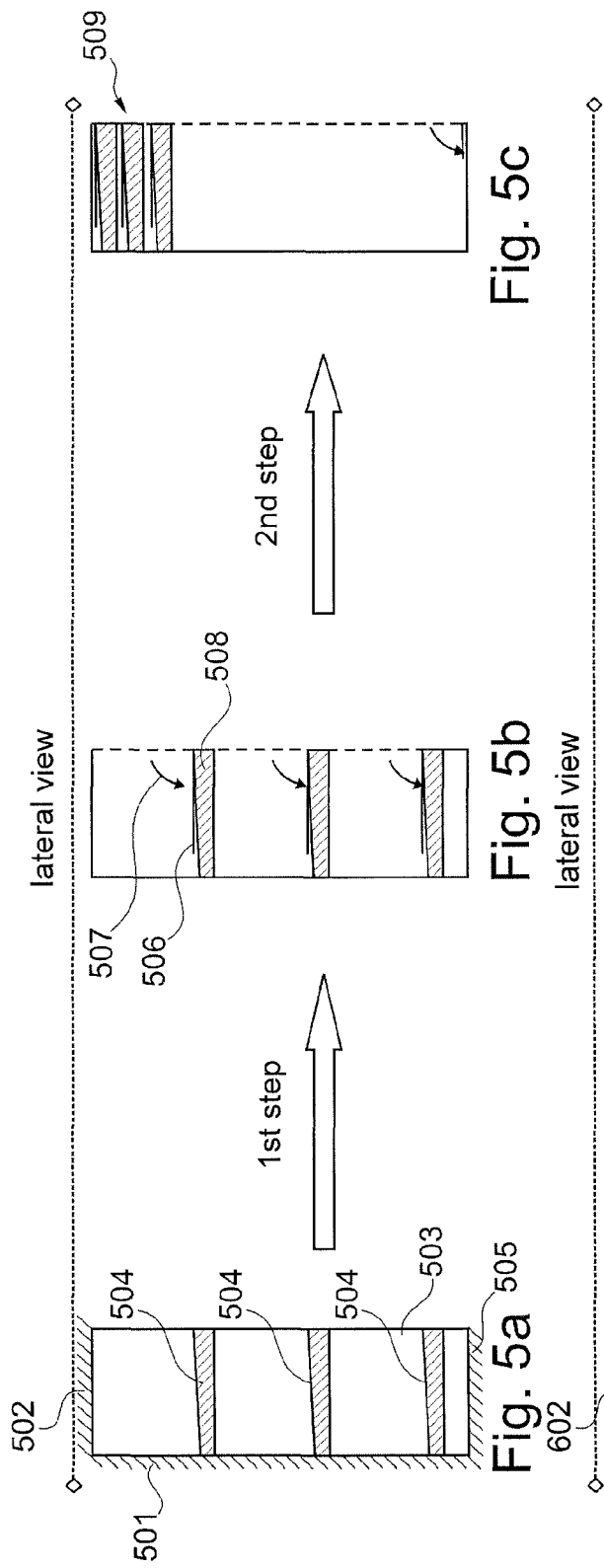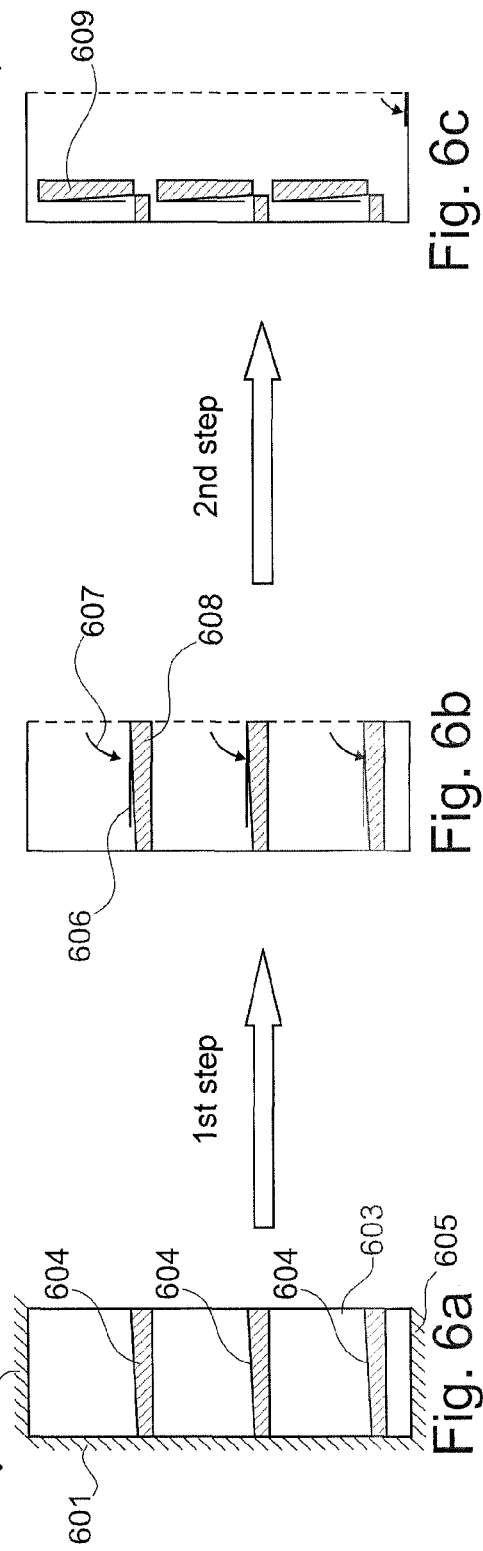

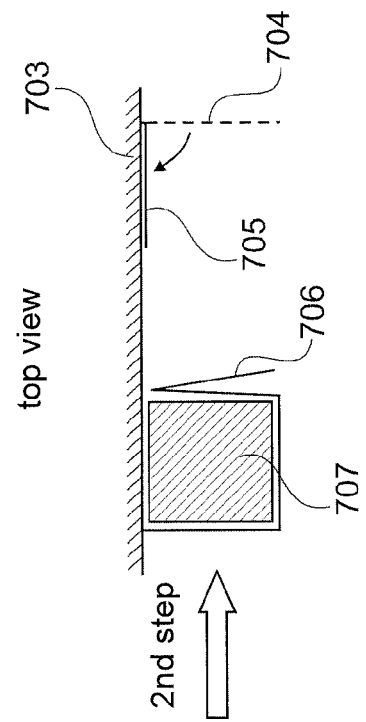
Fig. 7a
Fig. 7b
Fig. 7c
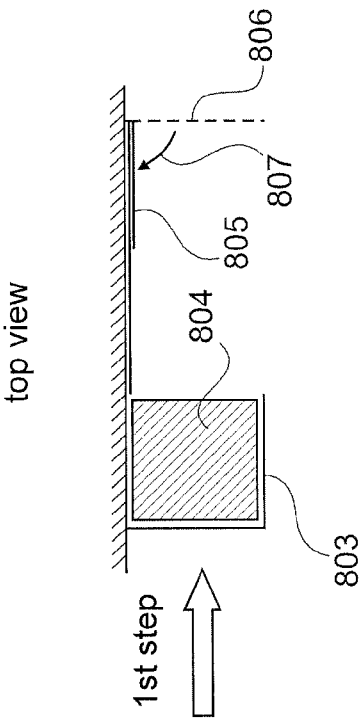
Fig. 8a
Fig. 8b
Fig. 8c

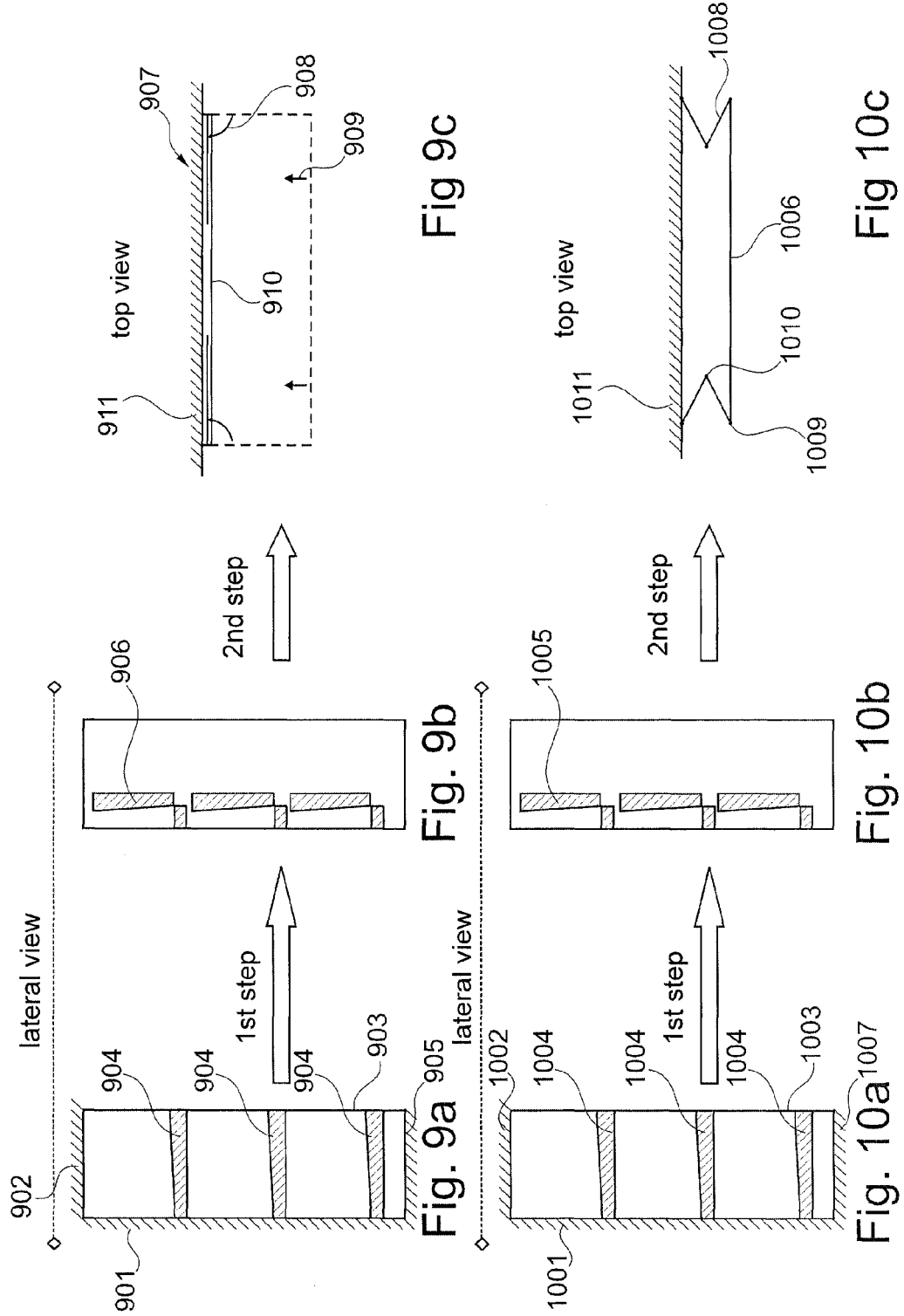

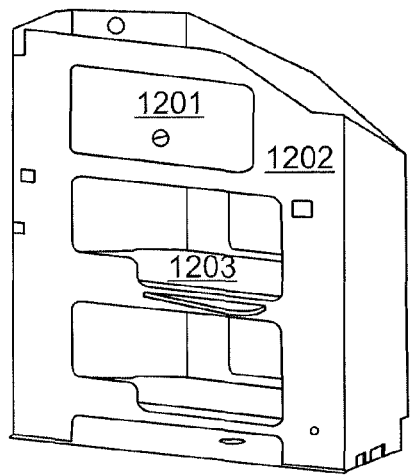
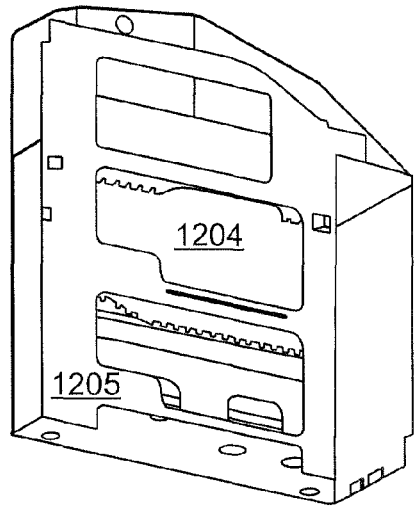
Fig. 12a          Fig. 12b
top view
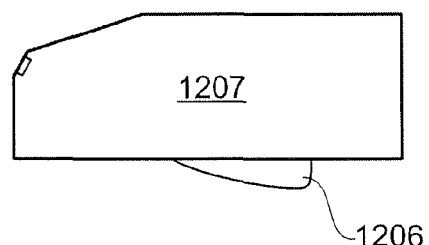
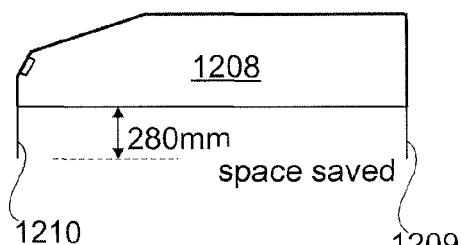
Fig. 12c          Fig. 12d

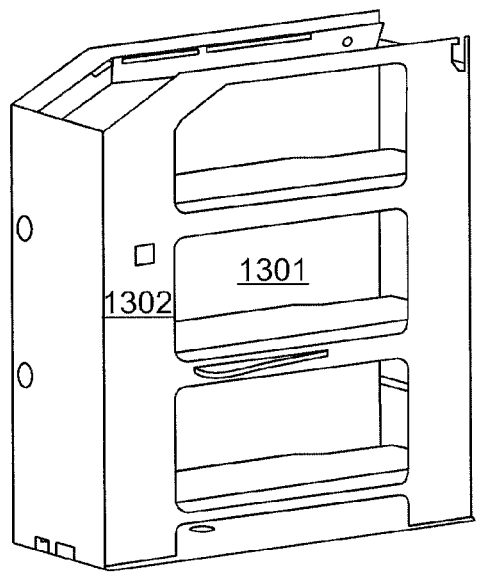
Fig. 13a
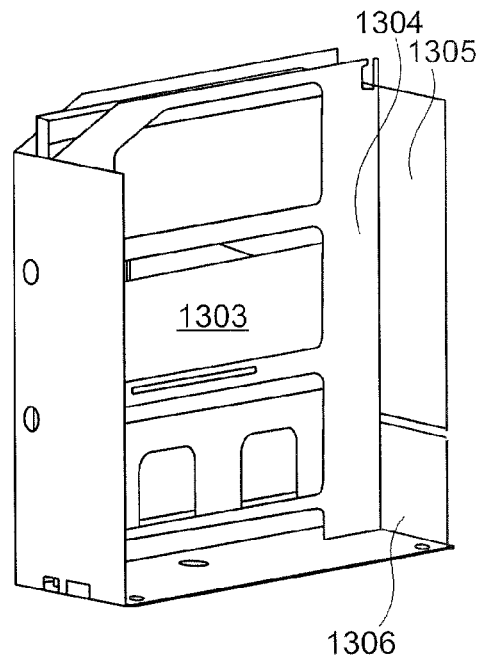
Fig. 13b
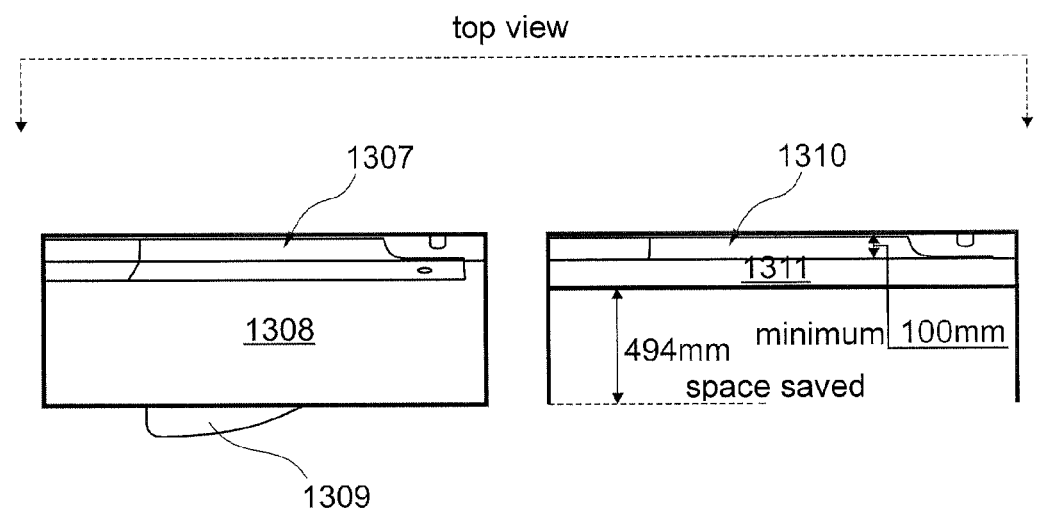
Fig. 13c
Fig. 13d

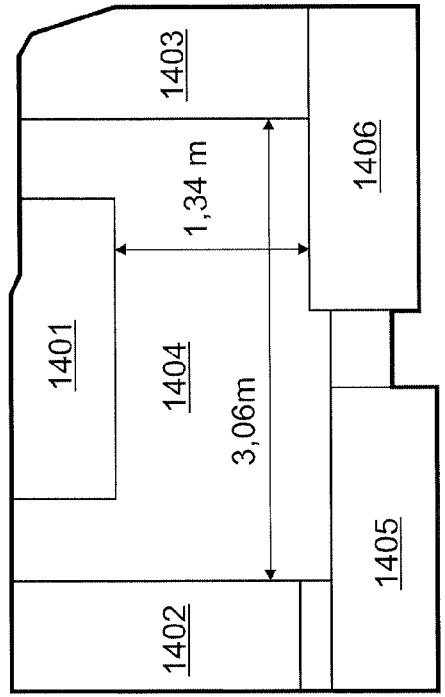
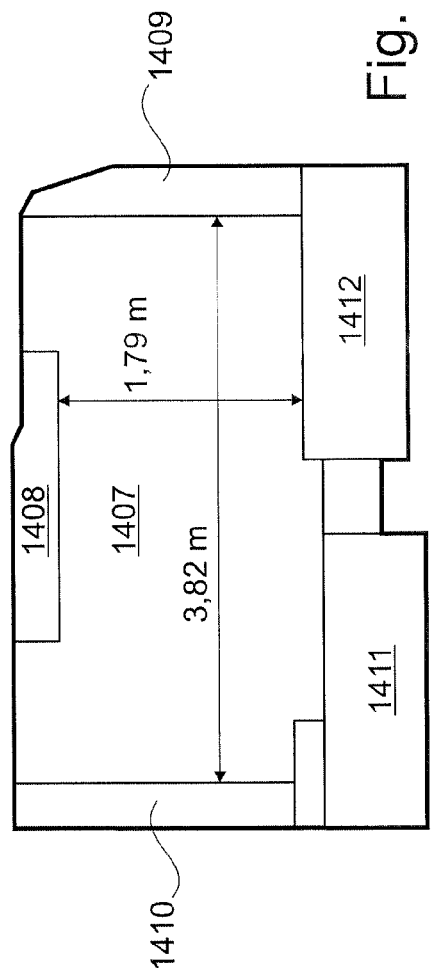

UNIT FOR ACCOMMODATION OF MEMBERS OF AN AIRCRAFT CREW

CROSS-REFERENCE TO RELATED APPLICATIONS

The present application is a national phase entry under 35 U.S.C. §371 of the International Application No. PCT/EP2009/059780, filed on Jul. 29, 2009, published in German, which claims the benefit of the filing date of German Patent Application No. 10 2008 035 375.2, filed on Jul. 30, 2008, and U.S. Provisional Application No. 61/137,362, filed on Jul. 30, 2008, the entire disclosures of which applications are hereby incorporated herein by reference.

FIELD OF THE INVENTION

The present invention relates to a unit or device for accommodating at least one member of the crew of an aircraft, as well as to a crew rest compartment that comprises a unit. Moreover, the invention relates to an aircraft comprising a crew rest compartment, as well as to the use of a crew rest compartment.

BACKGROUND TO THE INVENTION

In aircraft designed for long-haul flights there are closed sleeping and rest compartments for the aircraft's crews. These compartments are exclusively intended for use by the crew and are designed in such a specific manner that the crew can therein spend their rest phases and sleep phases on beds or seats.

Such rest compartments or sleeping compartments for members of the aircraft's crew are referred to as "crew rest compartments" (CRCs). CRCs are separate rooms that are only available for use by members of the crew. Members of the crew are divided into two groups, namely the flight crew, i.e. the pilots, and the cabin crew, which are frequently referred to as stewardesses or stewards. Pilots and the cabin crew have separate rest compartments, and consequently a distinction is made between flight crew rest compartments (FCRCs) for the pilots, and cabin crew rest compartments (CCRCs) for the cabin crew.

In long-distance flights with an extended flight duration of 8-18 hours, crew rest compartments are necessary because these flights are flown by two crews. There is thus the possibility of halving the service-free period between the first meal and the second meal on board, and in this arrangement rest 50% of the crew while the other half of the crew is on duty, and apart from monitoring the cabin and the lavatories is available to passengers for the provision of drinks and snacks. In order to ensure adequate rest for the crew, as a rule crew rest compartments must meet more stringent requirements relating to sound insulation than is the case for the normal aircraft cabin.

Flight crew rest compartments are always installed in close proximity to the cockpit so that in the case of an emergency the second crew can intervene quickly. Flight crew rest compartments are equipped very basically; they usually comprise a sleeping berth and a seat. The cabin crew rest compartments are installed in various locations in the aircraft. They provide more comfort than the FCRCs. The equipment of these compartments includes a separable dressing area with a mirror to allow the crew to freshen up for duty. This is important because the cabin crew has direct contact with passengers and represents the airline.

SUMMARY OF THE INVENTION

On long flights (e.g. intercontinental flights) the airlines would like to offer their passengers more than long hours of sitting. Passengers are to be given the opportunity to use the flight time in a meaningful way. On the other hand an aircraft provides only very limited space to meet such requirements.

It can thus be regarded as an object of the present invention to offer passengers options to spend their flight time in a meaningful or entertaining way.

This object is met in the independent claims. Further advantageous embodiments of the invention are disclosed in the subordinate claims.

The invention is to make possible an alternative use of the CRCs in those phases where they are not used as rest compartments for members of the crew.

As the first aspect of the invention, a unit for accommodating at least one member of a crew of an aircraft is provided, wherein the unit is designed in such a manner that it can be arranged in a crew rest compartment of an aircraft, wherein the unit comprises first means for changing the required space of the unit, wherein the unit comprises: a lying-down facility for a member of the crew, wherein the lying-down facility comprises first means for displacing the lying-down facility.

Changing the required space of the unit can be utilised for adapting the available space within the CRC to the respective use. Typically, a unit comprises 2 or 3 lying-down facilities, wherein the lying-down facilities are arranged one on top of the other, similar to a bunk bed. The lying-down facilities are usually designed as a bed with a mattress, a pillow and a cover. The first means are, for example, articulations, and consequently movability of the lying-down facilities is achieved. The movability of the lying-down facility can be used to achieve spatial displacement. In the context of this document, displacement of the lying-down facility refers, for example, to translational sliding or rotating on an axis, wherein sliding or rotating only part of the lying-down facility is also included.

As the second aspect of the invention, a crew rest compartment for accommodating at least one crew member is provided, wherein the crew rest compartment is designed in such a manner that it can be arranged in an aircraft, wherein the crew rest compartment comprises a unit of any one of claims 1 to 8.

The crew rest compartment makes it possible for the crew of an aircraft to rest or to sleep, wherein there are two different crew rest compartments, namely a flight crew rest compartment and a cabin crew rest compartment. The first compartment is for the pilots, while the second compartment is for the cabin crew.

As the third aspect of the invention, an aircraft is provided, wherein the aircraft comprises a crew rest compartment of any one of claims 9 to 12.

As the fourth aspect of the invention, the use of a crew rest compartment of any one of claims 9 to 12 is provided, wherein the crew rest compartment is used as a recreation room for passengers of an aircraft.

Exemplary embodiments are described in the dependent claims.

According to an exemplary embodiment of the invention, a unit is provided, wherein the lying-down facility comprises first means for displacing the lying-down facility within the unit.

Sliding the lying-down facilities provides the option of sliding the lying-down facilities upwards or downwards (possibly also in a horizontal plane) within the unit, and consequently available space is created within the unit.

In a further embodiment according to the invention, a unit is provided, wherein the lying-down facility comprises first means for folding up the lying-down facility.

Folding up also includes folding together or folding in, and consequently the lying-down facility overall takes up less space. Due to the transformation into a more compact form the available space in the unit and thus in the CRC can be enlarged.

According to a further exemplary embodiment of the present invention, a unit is provided, wherein the lying-down facility comprises first means for converting the lying-down facility from an essentially horizontal alignment to an essentially vertical alignment.

It would also be imaginable for the lying-down facility to merely be angled at an incline; in this case, too, an enlargement of the available space would result. The unit must of course be designed in such a manner that from an inclined or perpendicular alignment of the lying-down facility it is possible to again achieve a horizontal alignment of the lying-down facility.

According to an exemplary embodiment of the invention, a unit is provided, wherein the unit comprises second means for changing the space required for the unit, wherein the unit comprises: a front panel, wherein the front panel comprises second means for displacing the front panel.

The front panel is, for example, used to fasten the lying-down facility. The front panel needs to comprise recesses so that a crew member can use the lying-down facility. The recesses can be such that the front panel is then only used for fastening the lying-down facility and no longer has the function of a privacy shield.

In this context the term "displacement of the front panel" refers, for example, to translational sliding or rotating on an axis, wherein sliding or rotating only part of the lying-down facility is also included.

According to an exemplary embodiment of the invention, a unit is provided, wherein the front panel comprises second means for folding up the front panel.

The second means can, for example, be articulations, wherein foldability of the front panel is achieved. The articulations can also be arranged within the front panel, whereby separate parts of the front panel can be folded up.

In a further embodiment according to the invention a unit is provided, wherein the front panel comprises second means for placing at least part of the front panel onto the lying-down facility.

Placing at least part of a front panel onto the lying-down facility provides the option in a compact manner to arrange a combination of a lying-down facility and a front panel. As a result of this, the bulky lying-down facilities and the bulky front panel can be stowed away so that little space is required.

In a further embodiment according to the invention a unit is provided, wherein the unit comprises third means for changing the space required for the unit, wherein the unit comprises: a sidewall, wherein the sidewall comprises third means for displacing the sidewall.

The unit can also comprise two sidewalls unless a sidewall coincides anyway with a wall of the CRC.

In this context the term "displacement of the sidewall" refers, for example, to translational sliding or rotating on an axis, wherein sliding or rotating only part of the lying-down facility is also included.

According to a further exemplary embodiment of the present invention, a unit is provided, wherein the sidewall comprises third means for rotating the sidewall on an axis.

The sidewall can, for example, be rotated away to a rear of the unit. Furthermore, the sidewall can also comprise individual components that are connected by articulations.

According to an exemplary embodiment of the invention, a unit is provided, wherein the sidewall comprises third means for folding up the sidewall.

The sidewall represents a bulky part of the unit, because it protrudes, for example, perpendicularly from the outer wall of the CRC to the middle of the CRC. Folding up or folding together the sidewall thus results in increased available space in the CRC.

In a further embodiment according to the invention a crew rest compartment is provided, with a storage space, wherein the storage space comprises fourth means for displacing the storage space.

With the use of the fourth means it is, for example, possible to move the storage space below the floor of the CRC or above the ceiling of the CRC, whereby bulky storage spaces can be stowed away. The storage space can be a table or a smaller storage space, wherein the storage space can be designed for use by several persons at the same time, for example as a conference table, or for use by only a single person, for example as a bedside table.

According to a further exemplary embodiment of the present invention, a crew rest compartment is provided, comprising a monitor, wherein the monitor comprises fourth means for displacing the monitor.

According to an exemplary embodiment of the invention, a crew rest compartment is provided, wherein the fourth means comprise a telescopic arm.

A telescopic arm provides the option of the arm itself being retracted, whereby the element fastened thereto, for example a monitor or a slot machine, is moved back. In this manner the CRC can be cleared or can be prepared for use by passengers.

In a further embodiment according to the invention a use is provided, wherein the crew rest compartment is used for sports activities by passengers.

It may be considered an idea of the invention to design a crew rest compartment, in other words the rest area and sleeping area of the crew in such a manner that during times at which the crew do not use the crew rest compartment said rest area and sleeping area can be converted in such a manner that the crew rest compartment can be used in some other way by passengers. Alternative use is, in particular, imaginable as a conference room, as a fitness studio or for general entertainment (gambling, movie projection area). In this arrangement, in particular, the crew rest compartment of the cabin crew is to be used, because their crew rest compartment is usually anyway more spacious, which makes alternative use a better proposition. Since crew rest compartments are only used at specific times, alternative use of these areas is possible. The rest compartments are thus to be converted in such a manner that their use by passengers during the flight phase is possible. This provides an enlarged service palette to passengers. According to the invention, the space is changed by modification of the beds and walls to the effect that an increase in space is achieved. In order to make conversion possible, the beds can be designed as folding beds. Fixed walls can be displaced, so that a larger available space within the CRC is achieved. Apparatus for alternative use can be brought/folded from stowage spaces (within the CRC) and moved to the position to be used.

The individual features can, of course, also be combined, as a result of which, in part, advantageous effects may arise which exceed the sum of the individual effects.

BRIEF DESCRIPTION OF THE DRAWINGS

Further details and advantages of the invention are clarified with reference to the exemplary embodiments shown in the drawings. The following are shown:

FIGS. 2a-2d: a perspective view of a unit, in an elevation (see FIG. 2b), in a layout view (see FIG. 2c) and in a side elevation (see FIG. 2d), FIGS. 3a-3c: a folding variant, wherein the lying-down facilities are displaced upwards within the unit, and the front panel is folded, FIGS. 4a-4c: a folding variant, wherein the lying-down facilities are displaced upwards, and the individual components of the front panel are placed together and are subsequently arranged so as to be parallel to each other, FIGS. 5a-5c: a folding variant, wherein individual components of the front panel are placed on the lying-down facilities, and subsequently the front panels with the lying-down facilities are displaced upwards, FIGS. 6a-6c: a folding variant, wherein individual components of the front panel are folded onto the lying-down facilities, and subsequently the front panel lying-down facility combination is folded to the rear of the unit, FIGS. 7a-7c: a folding variant, wherein the lying-down facility is separated into individual components and these individual components are folded up, wherein the front panel is arranged around the folded-up lying-down facility, FIGS. 8a-8c: a folding variant, wherein the lying-down facility is folded up, and part of the front panel is arranged on the folded-up lying-down facility, and a second part of the front panel is moved to the rear wall of the unit, FIGS. 9a-9c: a folding variant, wherein the lying-down facility is folded away, and the front panel is moved to the rear wall of the unit, and the sidewalls are folded away to the rear of the unit, FIGS. 10a-10c: a folding variant, wherein the lying-down facilities are folded away, and the front panel and the sidewalls are folded to the rear of the unit, FIGS. 12a-12d: a unit, wherein the unit is shown in perspective view with a maximum volume (see FIG. 12a) and with a minimum volume (see FIG. 12b), and the unit is shown in layout view with a maximum volume (see FIG. 12c) and with a minimum volume (see FIG. 12d), FIGS. 13a-13d: a unit, wherein the unit is shown in perspective view with a maximum volume (see FIG. 13a) and with a minimum volume (see FIG. 13b), and the unit is shown in layout view with a maximum volume (see FIG. 13c) and with a minimum volume (see FIG. 13d), FIGS. 14a-14b: a crew rest compartment with five units, wherein the units are shown in layout view with a maximum volume (see FIG. 14a) and with a minimum volume (see FIG. 14b)

DETAILED DESCRIPTION OF EXEMPLARY EMBODIMENTS

FCRCs (flight crew rest compartments) usually cannot have an alternative use, because they provide very little space and are therefore unsuitable for multiple use. For reasons of safety and security, a CRC that is also intended for use by passengers should be easy to monitor by the crew and easily accessible to the crew, so that a check can be carried out as quickly as possible and if there are problems the crew can provide assistance. Furthermore, a CRC that provides a larger space is more suitable for multiple use, because this can result in a greater number of usage options. A CRC that is also to be used by passengers should have a height clearance that makes it possible for people to comfortably stand up.

The CRC is prepared for alternative use by means of modifications. The modifications ensure that existing items of equipment can in a space-saving manner be removed, folded away or displaced. To this effect in particular beds and tables need to be designed so that they can be folded away or displaced.

Figure 1:
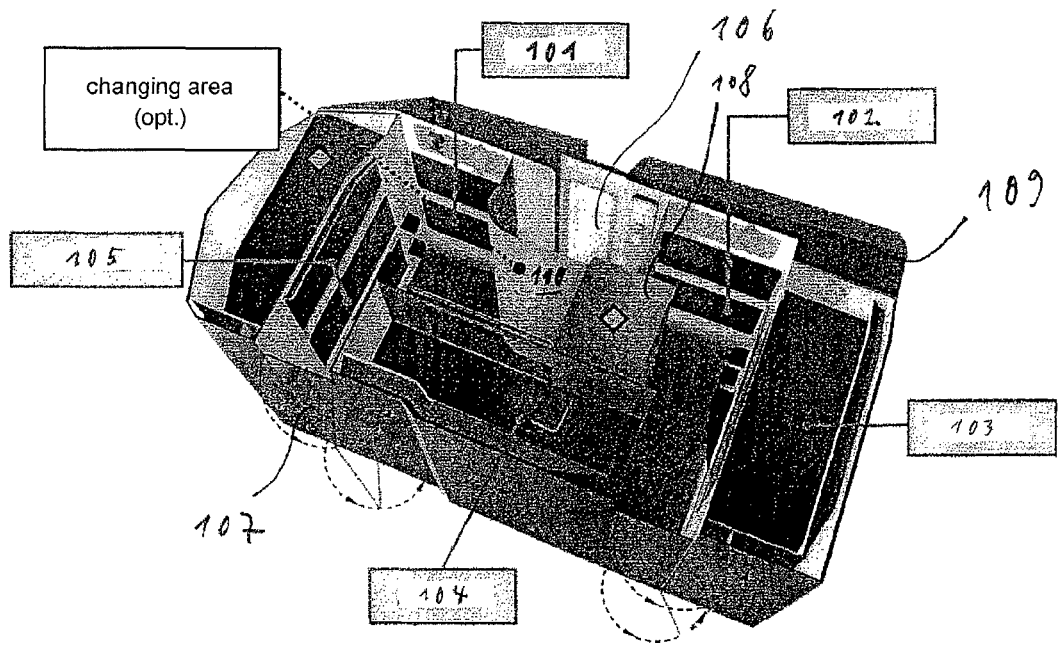
FIG. 1: a perspective top view of a crew rest compartment, wherein five units are

FIG. 1 in an exemplary manner shows a crew rest compartment (CRC). This CRC comprises several units 101, 102, 103, 104, 105, wherein the term "unit" typically designates an installation unit comprising several beds and in some cases stowage compartments. Overall five units are shown. Unit 101 comprises two beds and an upper stowage compartment. Unit 102 comprises two beds and an upper stowage compartment. Unit 102 can furthermore comprise a third bed that is foldable. As an alternative, both units 101 and 102 are identical. The third bed can thus be used depending on requirements. Unit 103 usually comprises three beds, wherein one bed is foldable so as to provide stowage space or a relaxation space if necessary. Unit 104 comprises three beds. Unit 105 comprises two beds and an upper stowage compartment, wherein if necessary the upper stowage compartment can be converted to a third bed. The CRC further comprises a lateral narrow stowage cabinet 109 beside unit 103. Furthermore, FIG. 1 shows a stowage cabinet 106 between unit 101 and unit 102, wherein this stowage cabinet 106 comprises a mirror door. The region in front of the stowage cabinet 106 serves as a changing area that can comprise a folding chair. This changing area is separated from the rest of the CRC by a flexible partition wall 110. The CRC is accessible by way of two doors 107. The CRC comprises an air conditioner that ensures general air supply to the CRC and to the individual beds, wherein the air conditioner comprises air outlets and additional individually-adjustable air nozzles and active air removal for the CRC as well as further ensuring that even with the curtains closed the air circulation is ensured. In principle in this arrangement the fresh air is obtained from the general air conditioning system. The distributed air is distributed within the crew rest compartment to each bed and to the ceiling. Furthermore, the air outlets are acoustically optimised so that good sound insulation is ensured. Furthermore, an individual air outlet for each bed is provided. The temperature within the CRC can be electronically be regulated and set to between 15° C. and 25° C. from the interior of the compartment. For safety reasons, in the CRC an oxygen container with an oxygen mask must be provided for each bed. Within the passage region of the CRC two oxygen containers with two masks must be installed. Furthermore, within the changing area an oxygen container must be available.

During reconfiguration of the unit, installation spaces for the supply duct and the service unit must be taken into account. Each sleeping berth has its own supply duct with the air conditioning pipes and also comprises a so-called PSU unit located in the head region. In the PSU unit the oxygen mask, a reading light and an individually adjustable air outlet are accommodated. In the head area there are also the internet connection, headphone connection (optional) and the remote control for the in-flight entertainment (IFE) monitor that is affixed to the foot end.

In relation to the space required for the air conditioning ducts a minimum distance of 100 mm depth to the wall has been determined. Depending on the installation space, this distance can vary. Furthermore, it must be kept in mind that the PSU is to be accommodated at some other position that is not affected by the modification. However, the PSU must be positioned in the head region because in a case of emergency the oxygen masks that are located therein must readily be at hand.

FIG. 2*a* shows a unit with three beds 203. The beds 203 are accessible from one side 202 and are, for example, connected on a wall 201 of the unit to the remaining CRC. The arrow 204 shows the direction of view that results in the illustration of FIG. 2*c*. The arrow 205 shows the direction of view that results in the illustration of FIG. 2*b*, while the arrow 206 shows the direction of view that results in the illustration of FIG. 2*d*.

FIG. 2*b* shows a lateral view of a unit. In this arrangement the wall 208, the ceiling 212 and the bottom 213 of the unit are connected to the CRC. Furthermore, FIG. 2*b* shows the beds 209 as well as the front panel 207.

FIG. 2*c* shows a top view of the unit, wherein a bed 210 is shown. Furthermore, a sidewall of the unit 208 as well as the front panel 207 are shown.

FIG. 2*d* shows a lateral view of the unit from the front, wherein the beds 211 as well as the lateral wall 208 of the unit are shown.

FIG. 3*a* shows a lateral view of a unit, wherein three beds 303 are shown. Furthermore, a front panel 304 is shown that comprises openings, whereby the beds 303 are accessible. The rear 301, the bottom 305 as well as the ceiling 302 of the unit are connected to the remaining CRC.

FIG. 3*b* shows the same lateral view of the unit, wherein, however, the beds 306 have been pushed together upwards. This results in a cleared space within the unit.

FIG. 3*c* shows a top view of the unit after the front panel 310 has been folded. Furthermore, the rear 307 of the unit is shown, which is connected to the remaining CRC. The unit can comprise various boards 308, 309 which can, for example, be used as a storage space. These boards 308, 309 can be designed so as to be foldable, whereby the boards can be folded to the rear 307 of the unit so that they no longer protrude. FIG. 3*c* shows a storage space 308 that is not folded away, and the same storage space 309 folded away to the rear wall 307.

FIG. 4*a* shows a lateral view of a unit comprising three beds 403 and a front panel 404. The rear 401, the ceiling 402 and the bottom 405 of the unit are connected to the remaining CRC.

FIG. 4b shows the unit, wherein the beds 406 are arranged so as to be pushed together upwards. This creates an available space in the region below.

FIG. 4c shows the front panel 310, which can be divided into perpendicular parts, wherein the individual parts have been pushed one behind the other to the side. FIG. 4c further shows sidewalls 411, 412, wherein a situation is shown in which the sidewall 411 protrudes perpendicularly from the rear 409 of the unit. Furthermore, the diagram shows how the sidewall 412 is arranged so as to be folded to the rear 409 of the unit. The direction of folding is indicated by an arrow 410.

FIG. 5a shows a lateral view of a unit comprising three beds 504. Furthermore, the ceiling 502, the rear 501 and the bottom 505 of the unit are shown, which are all connected to the remaining CRC. Furthermore, FIG. 5a shows the front panel 503, wherein the front panel is divided into three parts.

FIG. 5b shows how parts of the front panel 506 can be folded onto the beds 508. The arrow 507 indicates the direction of folding.

FIG. 5c shows the unit, wherein the individual bed-front panel units 509 are arranged so as to be displaced upwards.

FIG. 6a shows the unit with its ceiling 602, its rear 601 and its bottom 605, wherein all these components of the unit are connected to the remaining CRC. Furthermore, the front panel 603 is shown, as are three beds 604.

FIG. 6b shows that individual components of the front panel 606 are folded onto the beds 608. The arrow 607 indicates the direction of folding.

FIG. 6c shows a further step in which the beds 609 are folded away to the rear of the unit.

FIG. 7a shows the front of a unit that comprises three beds 701.

FIG. 7b shows that the beds 702 are divided into several sections, whereby the beds 702 are designed so as to be foldable.

FIG. 7c shows how a free-standing front panel 706 is arranged so as to be pushed against the folded beds 707, and the lateral part 704, 705 is folded inwards to the rear 703 of the unit.

FIG. 8a shows a front view of a unit comprising three beds 801.

FIG. 8b shows the three beds 802 folded up.

FIG. 8c shows that one part of the front panel 803 has been pushed against the folded beds, and a second part of the front panel has been moved to the rear wall of the unit. The sidewall 805, 806 has been folded inwards to the rear of the unit. The diagram shows the sidewall 806 that protrudes perpendicularly from the rear, and further shows the sidewall 805 folded away to the rear. The arrow 807 shows the direction of folding. The folded-up beds are designated with reference character 804.

FIG. 9a shows a unit comprising a ceiling 902, a rear 901 and a bottom 905, wherein these components are connected to the remaining CRC. Furthermore, a front panel 903 and the beds 904 are shown.

FIG. 9b shows how the beds 906 are arranged so as to be folded away upwards towards the rear of the unit. It would also be possible to fold the beds away downwards or to the side.

FIG. 9c shows that the sidewalls 911 have been folded inwards, and the front panel 910 has been pushed against the sidewalls 911. In this arrangement the arrow 908 shows the folding direction of the sidewalls 911, and the arrow 909 shows the displacement direction of the front panel 910 in the direction of the rear 907.

FIG. 10a shows a unit comprising a ceiling 1002, a rear 1001 and a bottom 1007, wherein these components of the unit are connected to the remaining CRC.

FIG. 10b shows a lateral view of the unit, wherein the beds have been folded away towards the rear of the unit.

FIG. 10c shows how the front panel 1006 can be displaced towards the rear of the unit. This is achieved by articulations 1009, 1010, 1011 within the sidewalls 1008, which articulations 1009, 1010, 1011 make it possible to fold up the sidewalls 1008.

The UD-CCRC is one example of a CRC. The DU-CCRC provides approx. 4.1 m² of available area without the units. After the units 2, 4 and 5 have been folded in, the area is 6.9 m². Thus, by means of folding-in, an increase of approx. 2.8 m² in the available space has been achieved.

Figure 11A:
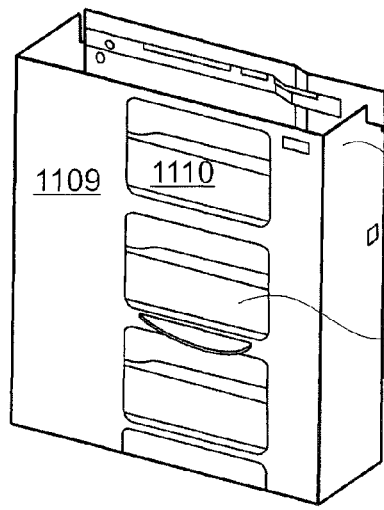
FIGS. 11a-11d: a unit, wherein the unit is shown in a perspective view with a maximum volume (see FIG. 11a) and with a minimum volume (see FIG. 11b), and the unit is shown in layout view with a maximum volume (see FIG. 11c) and with a minimum volume (see FIG. 11d)

FIG. 11a shows a unit comprising three beds 1110. Also shown are the front panel 1109 of the unit as well as the sidewall 1101 of the unit and the recesses 1102 of the front panel 1109, to enable access to the beds 1110.

Figure 11B:
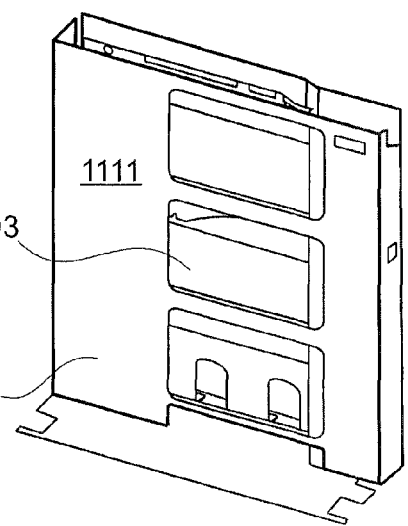

FIG. 11b shows the front panel 1111 with recesses 1103, wherein the front panel 1111 is offset in the direction of the rear of the unit.

Figures 11C, 11D:
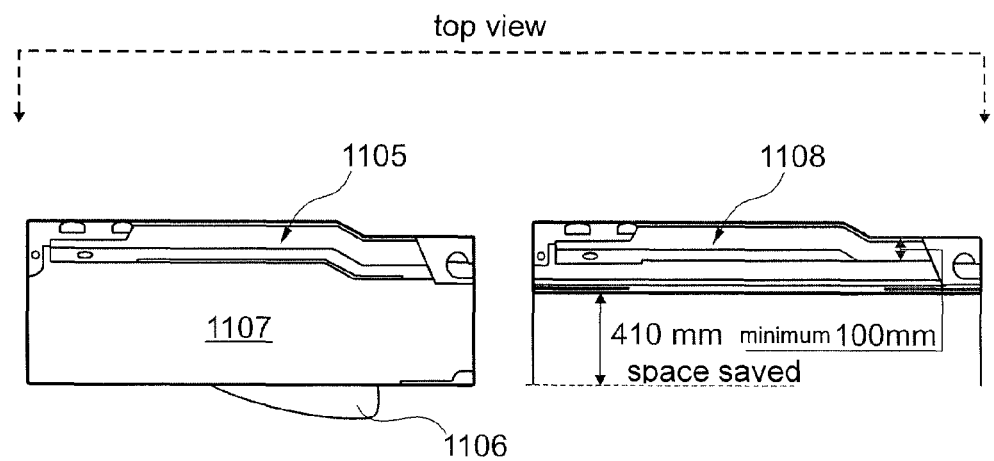

FIG. 11c shows a top view of the unit of FIG. 11a. In the region 1107 the beds are arranged, while in the region 1105, for example, the distribution pipes of the air conditioning system are arranged. Furthermore, a storage space 1106 is shown, which can be designed so as to be foldable.

FIG. 11d shows the same unit as shown in FIG. 11a and FIG. 11b, except that in this situation there is no region 1107. This region is almost entirely done without, whereby available space results. In contrast to this, the supply pipes of the air conditioning system cannot be folded away or removed, and for this reason a large region 1108 remains for receiving the supply lines.

FIG. 12a shows a further unit that comprises beds 1201, 1203. The bed 1201 is only intended for optional use, and can therefore be closed off (as shown in the drawing). The unit further comprises the front panel 1202.

FIG. 12b shows the same unit with the three beds 1204, wherein now the front panel 1205 is offset in the direction of the rear of the unit.

FIG. 12c shows a top view of the unit of FIG. 12a, wherein the diagram shows that the unit 1207 has a certain width and projects far into the inner region of the CRC. Furthermore, a storage space 1206 is shown which can be folded inwards into the unit 1207 or folded laterally against the unit 1207.

FIG. 12d shows a top view of the unit of FIG. 12b, wherein the unit 1208 is less wide when compared to the situation in FIG. 12a and FIG. 12c. This results in a larger available space within the CRC. FIG. 12d shows the sidewalls 1209 and 1210, which if necessary can be folded away, displaced or offset.

FIG. 13a shows a unit comprising three beds 1301 that are arranged behind a front panel 1302.

FIG. 13b shows the same unit with the beds 1303, wherein the front panel 1304 is arranged so as to be offset towards the rear of the unit. By sliding the front panel 1304 there is more available space within the CRC. After the front panel 1304 has been arranged so as to be offset, the sidewalls 1305, 1306 protrude, and if necessary can be folded away, offset or removed.

The space gained is clearly recognisable with reference to the two FIGS. 13c and 13d. FIG. 13c shows the "extended" unit with a region 1308 provided for the beds. Furthermore, a further storage space 1309 and the supply ducts 1307 are shown.

FIG. 13d shows the situation after as much available space as possible has been created in the CRC. The region 1308 of FIG. 13c has been reduced to the region 1311 of FIG. 13d, which is significantly smaller. However, the supply ducts 1311 are almost unchanged as far as their required space is concerned. Furthermore, the supply ducts 1307 and 1310 are shown, whose required space can hardly be reduced.

FIG. 14a shows a top view of a CRC that is ready for use by the crew of the aircraft. All the units 1401, 1402, 1403, 1405 and 1406 are "extended" and useable for crew members to rest or sleep.

FIG. 14b shows the CRC with the units 1408, 1409, 1410 whose space requirement has been reduced. Units 1411 and 1412 remain unchanged because these units have been installed at an inclination and therefore an analogous reduction in the required space would result in expanded space that could not be sensibly utilised because at these positions it is not possible to achieve adequate height clearance. In these regions passengers would therefore always have to stand up stooped or to sit, which does not provide adequate comfort.

Figure 15:
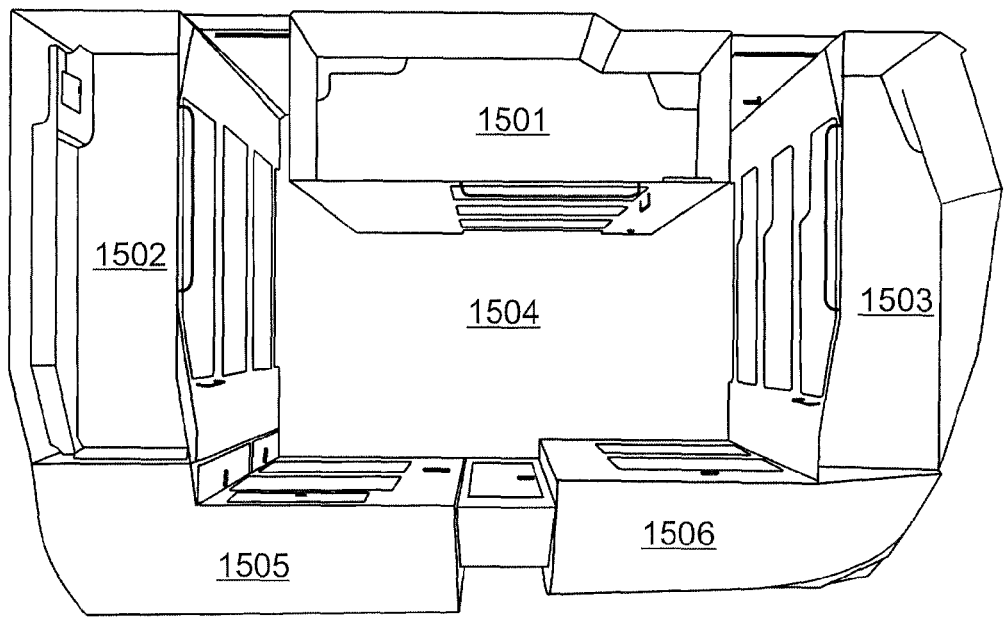
FIG. 15: a bird's eye view of a cabin crew rest compartment, wherein the units take up the maximum space.

In a perspective top view FIG. 15 shows the CRC with the units 1501, 1502, 1503, 1505 and 1506. In the interior region of the CRC there is available space, which can, however, be relatively confined because of the units.

Figure 16:
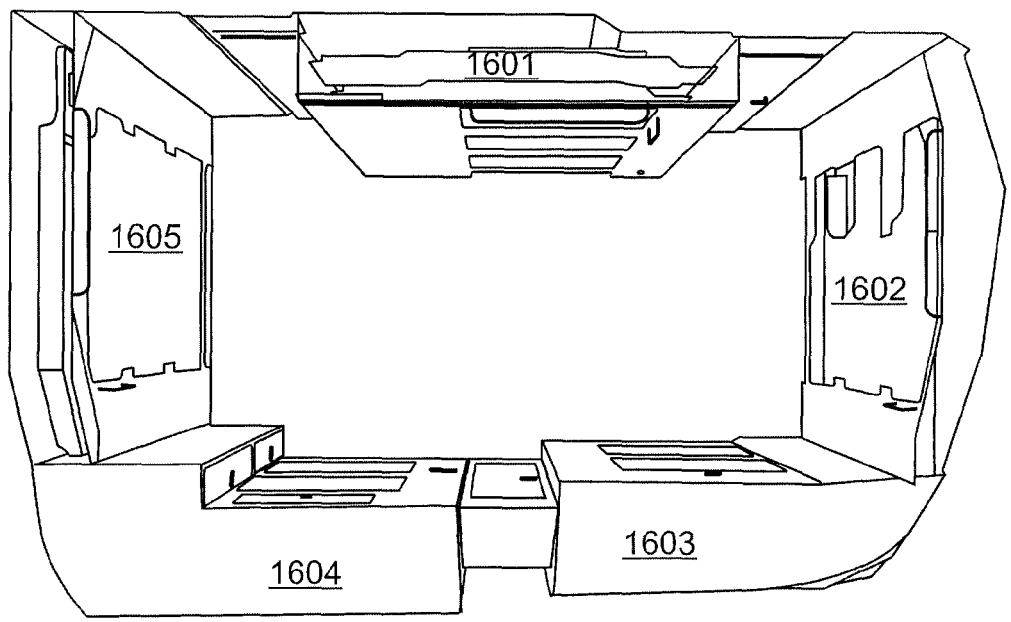
FIG. 16: a bird's eye view of a cabin crew rest compartment, wherein the units take

In a perspective top view FIG. 16 shows the CRC, wherein the units 1601, 1602 and 1605 as a result of conversion take up significantly less space when compared to the situation according to FIG. 15. The units 1603 and 1604 remain unchanged because no sensible saving of space is possible with them as a result of the roof inclination in the region of these units 1603, 1604.

A cleared CRC can basically be used for a host of different applications. In order to meet business requirements the CRC could, for example, be converted to a meeting room, seminar room or conference room. To this effect the CRC should, for example comprise a computer, telephone, fax and internet connections as well as work desks.

The CRC could, furthermore, be equipped as a gambling room, for example for poker, roulette etc. The CRC could house a pinball machine or slot machines.

The CRC could be equipped as a wellness studio and could comprise a sauna, a whirlpool, showers, a hairdressing salon, a solarium, a rest compartment or a sound space. Furthermore, in a wellness studio it would be possible to offer passengers a massage, manicure, pedicure, cosmetics applications or yoga.

The CRC could be prepared for sports activities by passengers, wherein fitness exercises, dancing, martial arts training, rowing, baseball, golfing, cycling or go-karting could be offered. Furthermore, in a converted CRC it would be possible to offer video games, e.g. interactive video games.

As a further alternative use, setting up a bar in a CRC would be imaginable, so that passengers could partake in the offer of a sociable music experience, e.g. also karaoke, or general opportunities to celebrate or to communicate.

The CRC could, furthermore, be used for childcare, so that children would have the opportunity, for example, to play board games.

There are innumerable further options to use a cleared CRC for interesting or entertaining applications by passengers. The following possible examples could be mentioned: feng shui applications, religious events, options for swimming, laundry facilities, ironing services, for reading or generally for information gathering.

One application of the invention relates to the use as a massage compartment and rest compartment. Passengers could rest and relax while enjoying a massage. The massage would be accompanied by soothing sounds to help forget everyday stress. Whole-body or partial-body massage are offered. In the case of partial-body massage, there is a choice among calf massage, back massage or neck massage. The massage is not only good for relaxation but also has the additional effect of enhancing blood circulation. At altitudes of approx. ten km the human body is subjected to much greater forces. As a result of a lack of body movement, because most of the flight time is spent seated, blood circulation is impeded. In extreme cases such impeded blood circulation can result in thrombosis. Massage is thus not only relaxing but also health promoting.

Figure 17A:
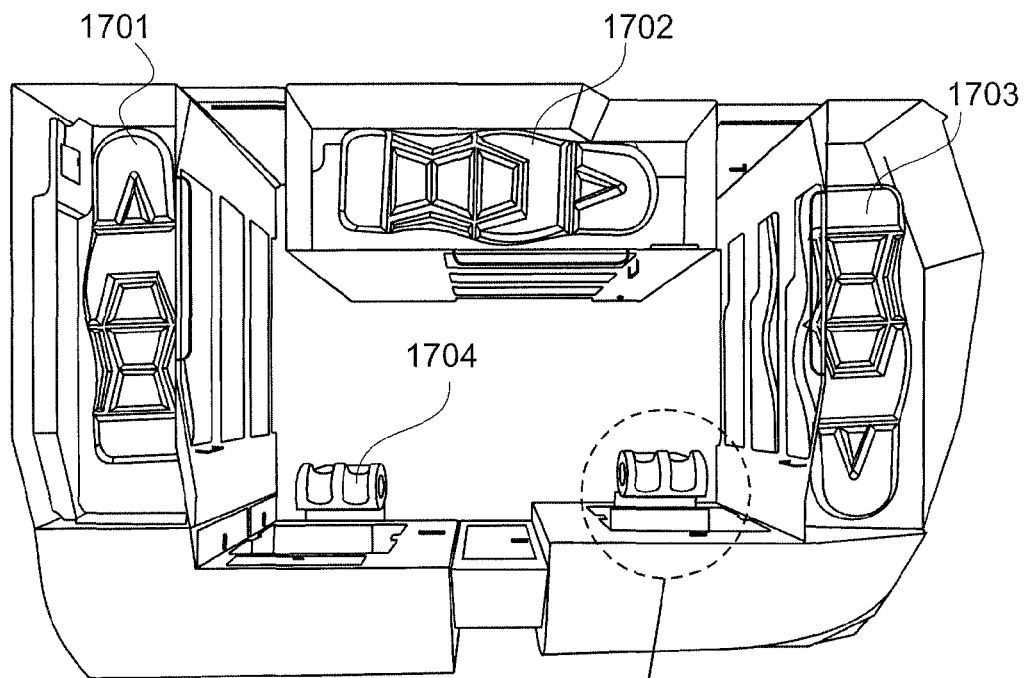
FIGS. 17a-17b: a bird's eye view of a crew rest compartment for use as a massage compartment and rest compartment (see FIG. 17a) and in a lateral perspective view (see FIG. 17b)

FIG. 17a shows a CRC that has been converted to a massage compartment and rest compartment. In this arrangement units 1701, 1702 and 1703 have not been changed. Instead, the beds of the units 1701, 1702, 1703 now comprise padding (massage mats) that make it possible to offer massage services. Furthermore, the CRC comprises a calf massaging apparatus 1704.

Figure 17B:
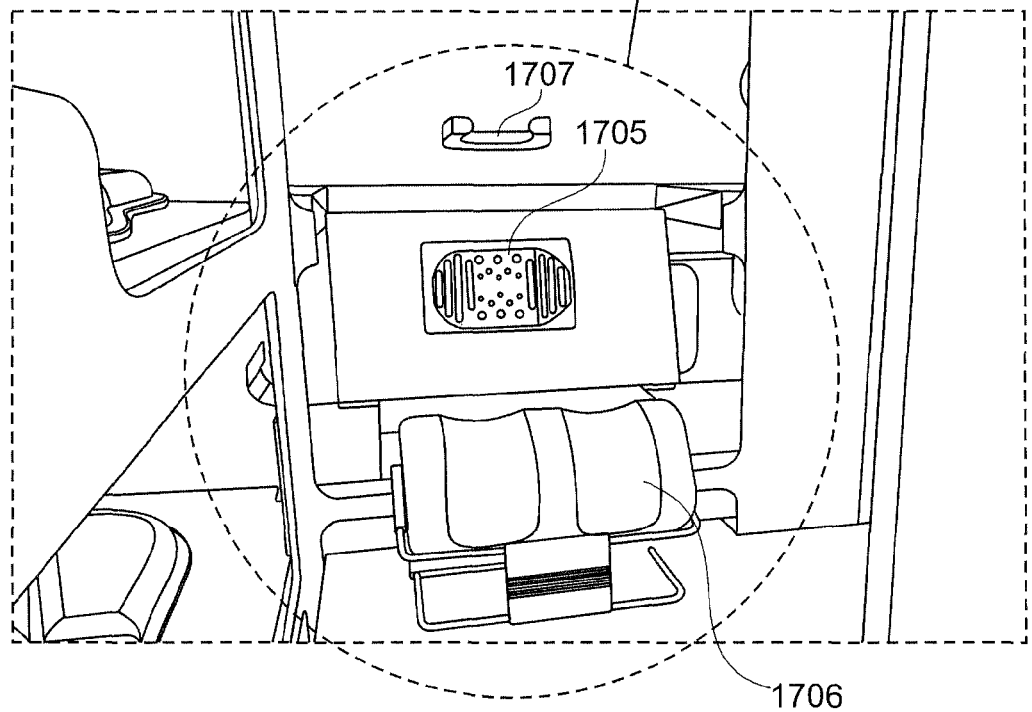

FIG. 17b shows the arrangement of a calf massaging apparatus 1706 and of a back massaging apparatus 1705. Furthermore, a massaging apparatus for the neck is arranged. These apparatuses are arranged in such a manner that, for example, the lower beds of the units are used as seating space.

Figure 18:
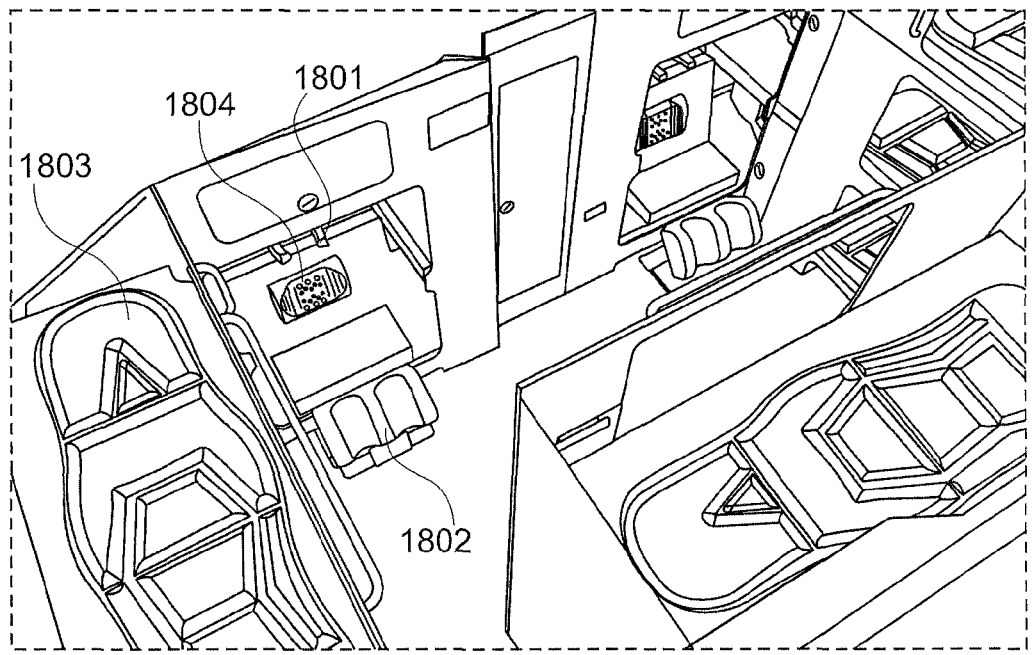
FIG. 18: a bird's eye view of a crew rest compartment for use as a massage compartment and rest compartment.

FIG. 18 shows the massage compartment and rest compartment with back massaging apparatus 1801, calf massaging apparatus 1802, a massage mat 1803 and neck massaging apparatus 1804.

Figure 19:
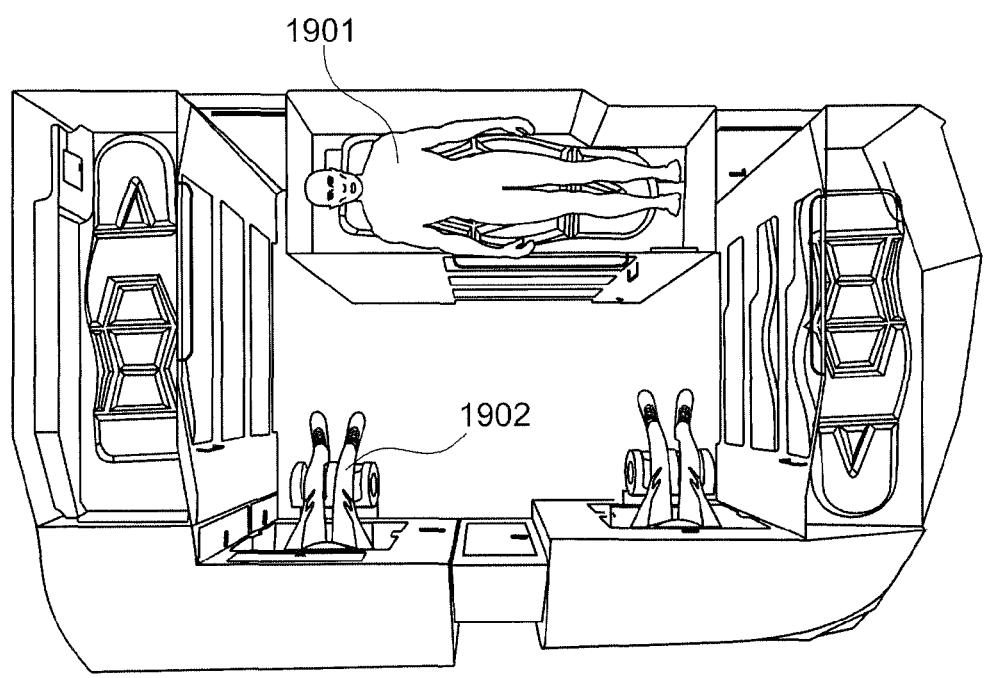
FIG. 19: a bird's eye view of a crew rest compartment for use as a massage compartment and rest compartment with diagrammatically indicated people.

FIG. 19 shows the massage compartment and rest compartment, wherein its use by people is diagrammatically shown. For example, the uppermost bed of the unit 1901 shows a person lying on a massage mat. A further person is shown using the seat near calf massage apparatus 1902.

Figure 20:
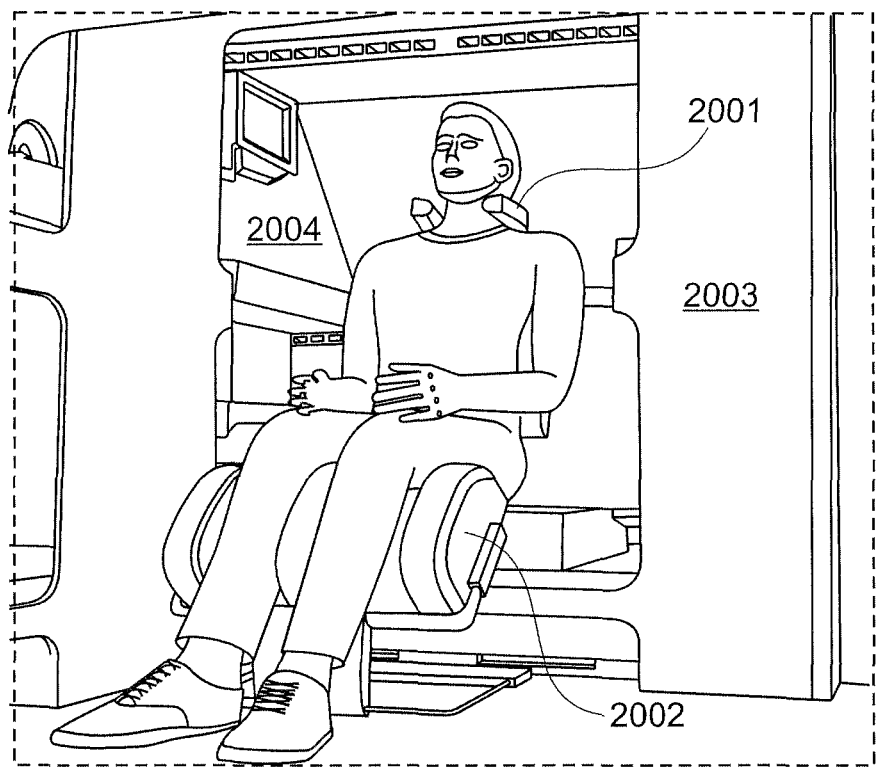
FIG. 20: a lateral perspective view of a crew rest compartment for use as a massage compartment and rest compartment.

FIG. 20 shows a person seated in the massage studio. The person is seated within a protrusion 2004 of a unit that arises as a result of clearing away beds. The person is being massaged by calf massage apparatus 2002 and neck massage apparatus 2001. In this application the front panel 2003 of the unit remains unchanged.

Figure 21:
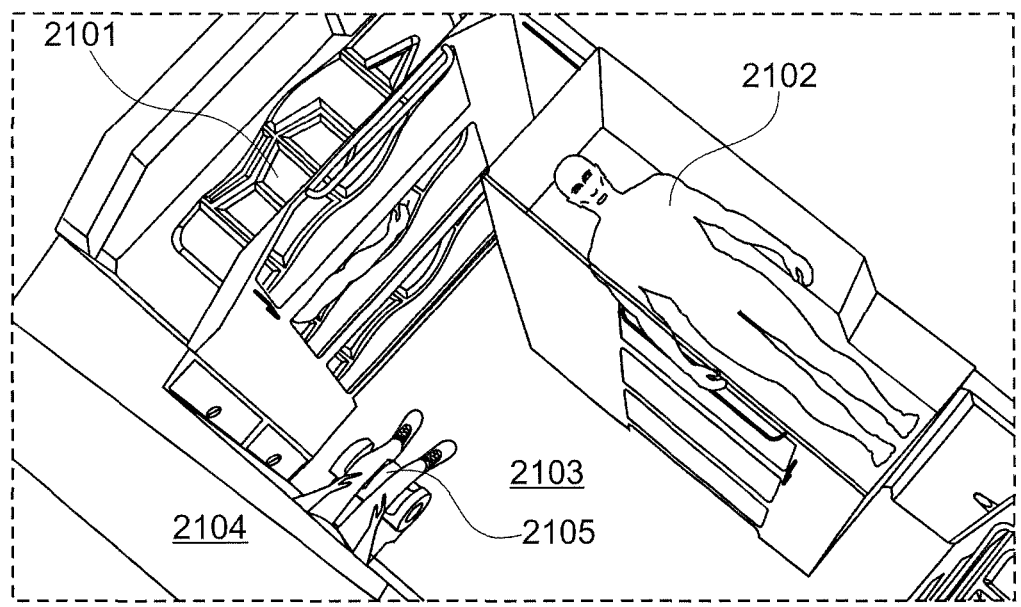
FIG. 21: a bird's eye view of a crew rest compartment for use as a massage compartment and rest compartment with diagrammatically indicated people.

FIG. 21 shows a perspective top view of a section of the massage compartment and rest compartment, wherein the massage mats 2101, 2102 and calf massaging apparatus 2105 are clearly shown. The passenger whose calves are being massaged can take a seat in unit 2104. The available space 2103 of the CRC remains unchanged when compared to its use as a crew rest compartment.

A further embodiment of the invention relates to the use as a conference room. The CRC offers business travelers space for team meetings or conferences. Furthermore, the option can be provided of being connected to a client by way of video transmission.

Figure 22:
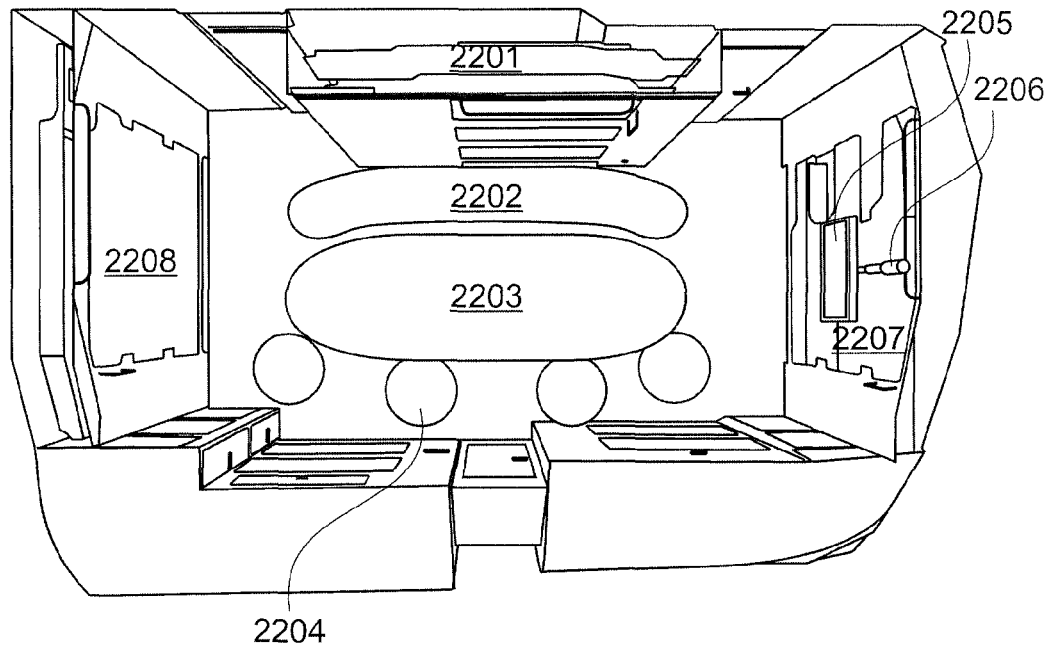
FIG. 22: a bird's eye view of a crew rest compartment for use as a conference room.

FIG. 22 shows the use of a CRC as a conference room. For this purpose, stools 2204, a bench 2202 and a conference table 2203 are arranged in the CRC. Units 2201, 2207 and 2208 are arranged so that they take up less room, so that as spacious a conference room as possible is obtained. The conference room further comprises a monitor 2205 that is arranged on a telescopic arm 2206. Because of the telescopic arm 2206 the monitor can be moved away after use in order to prepare the CRC so that it is again ready for use by the crew.

Figure 23:
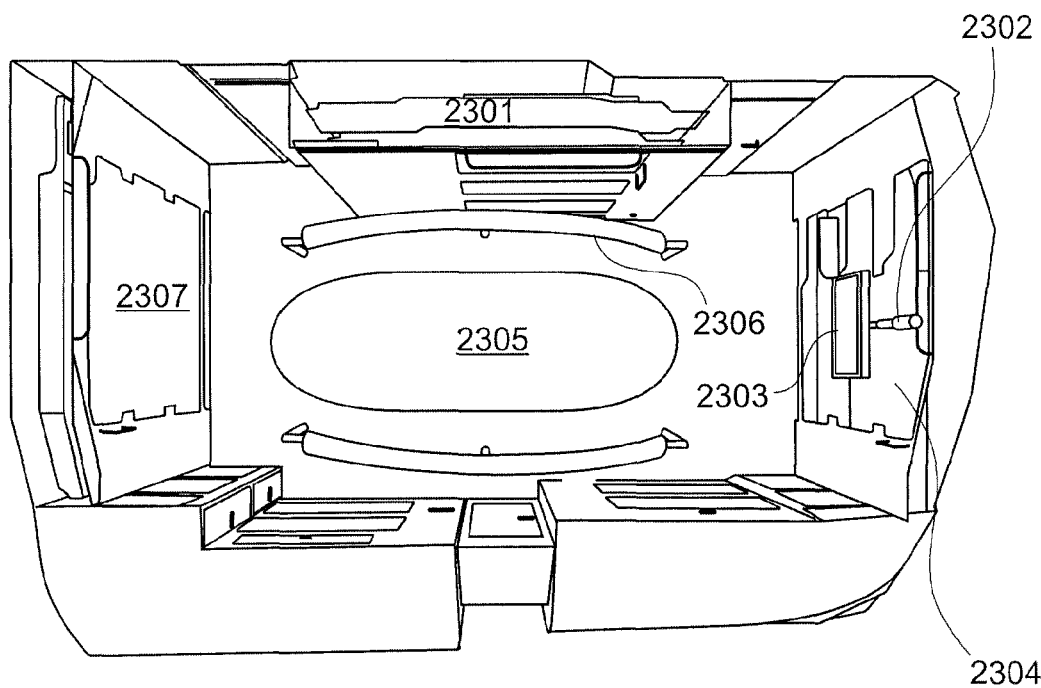
FIG. 23: a bird's eye view of a crew rest compartment for use as a conference room.

FIG. 23 shows the CRC as a conference room, wherein in the CRC there are a conference table 2305, two anti-fatigue stand-up devices 2306 and a monitor 2303 with a telescopic arm 2302. Units 2301, 2304 and 2307 are arranged in a space-saving manner.

Figure 24:
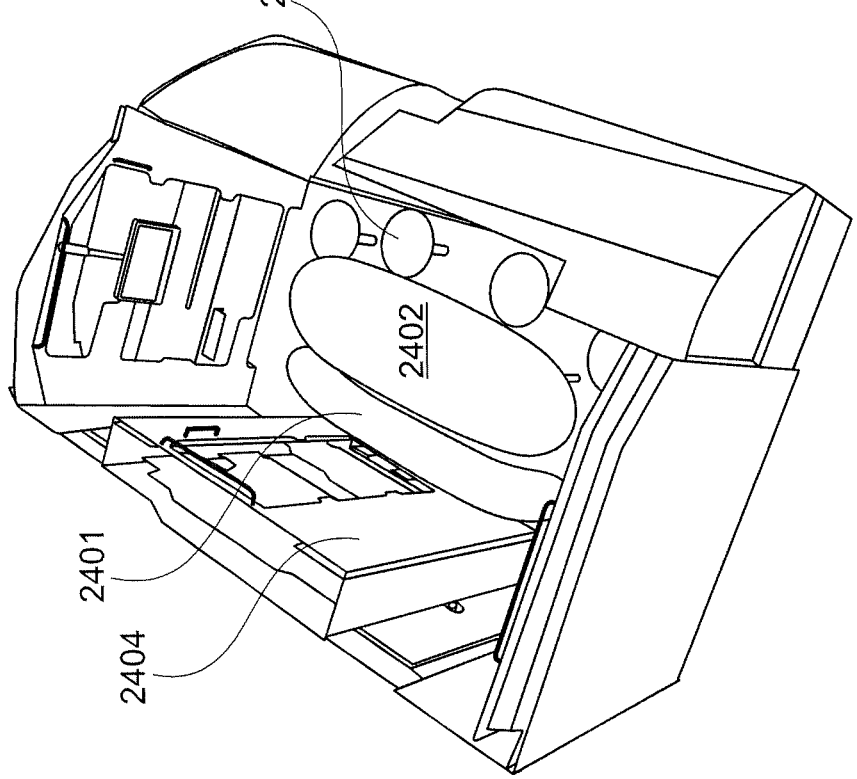
FIG. 24: a bird's eye view of a crew rest compartment for use as a conference room.

FIG. 24 shows a perspective top view of the conference room with a conference table 2402, a bench 2401, stools 2403 and a unit 2404.

Figure 25:
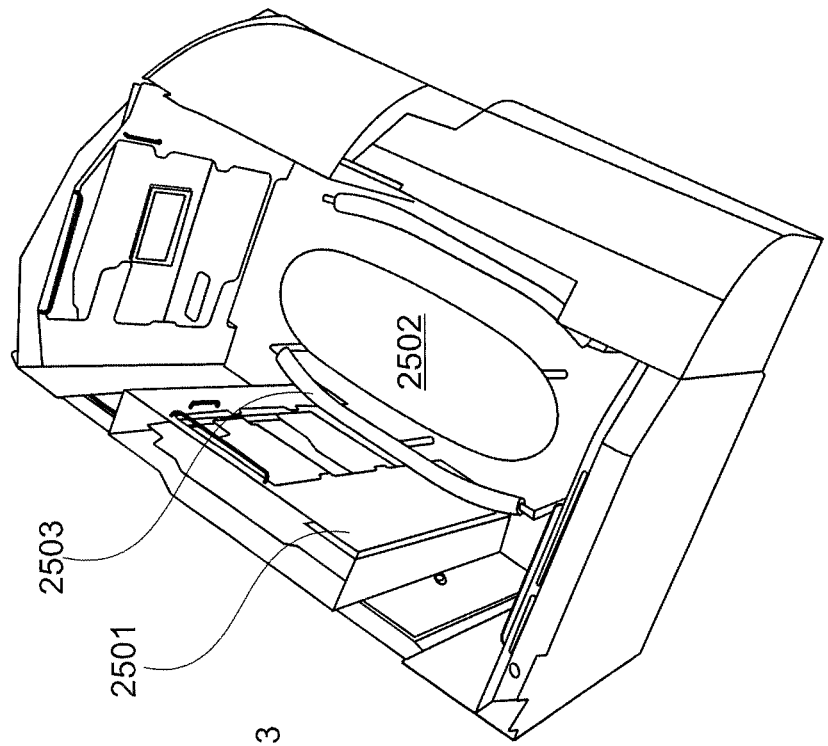
FIG. 25: a bird's eye view of a crew rest compartment for use as a conference room.

FIG. 25 shows a perspective top view of the conference room with a conference table 2502 and two anti-fatigue stand-up devices 2503. In this arrangement, unit 2501 is shown in its folded state.

Figure 26:
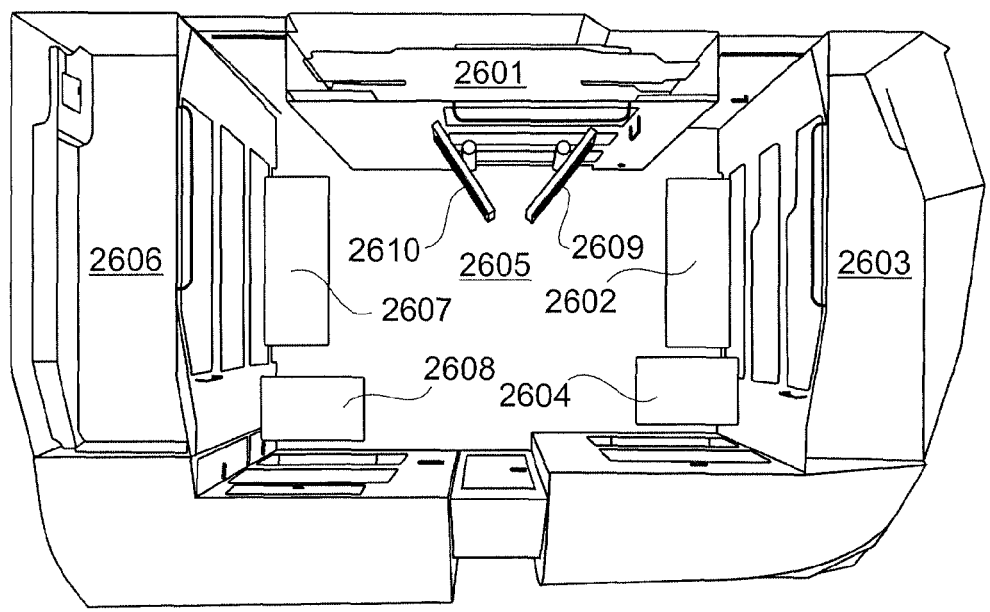
FIG. 26: a bird's eye view of a crew rest compartment for use as a conference room.

FIG. 26 shows the CRC with a folded unit 2601 and with the units 2606 and 2603. In this arrangement units 2606 and 2603 are used as seats and are not folded. The CRC comprises tables 2607, 2608, 2602 and 2604. Passengers can be seated in the units and can be entertained or informed by means of monitors 2610 and 2609. When compared to its use as a crew rest compartment, the available space 2605 of the CRC is approximately the same size (only unit 2601 was folded up to make room for the monitors 2610 and 2609).

Figure 27:
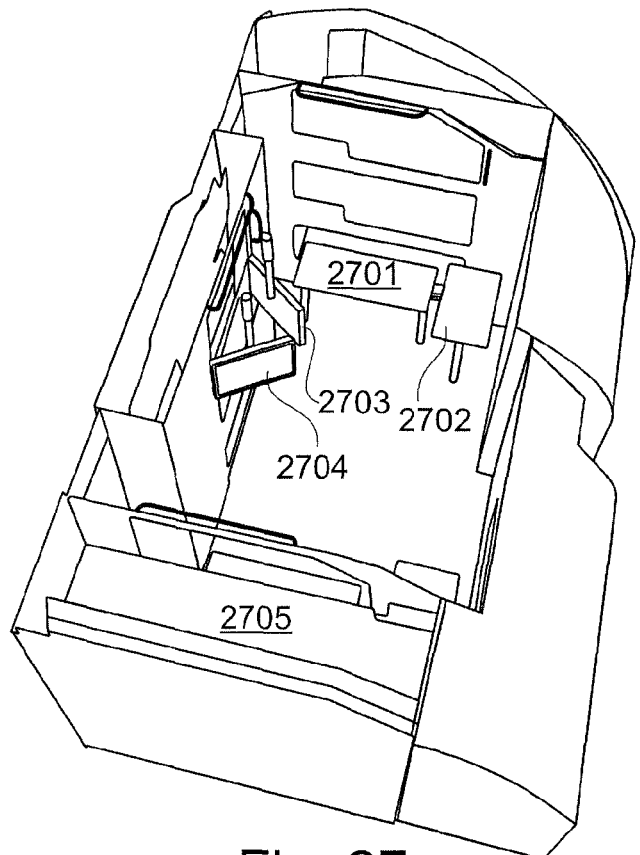
FIG. 27: a bird's eye view of a crew rest compartment for use as a conference room.

FIG. 27 shows the same space in a perspective top view. Unit 2705 is used as a seat. The CRC comprises a table 2701, 2702 as well as monitors 2704 and 2703.

Figure 28:
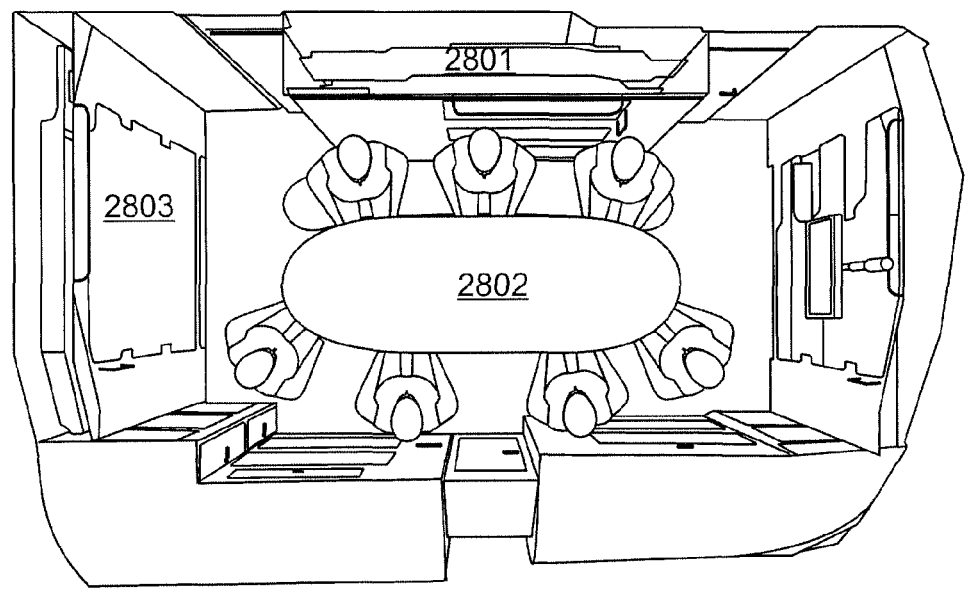
FIG. 28: a bird's eye view of a crew rest compartment for use as a conference room

FIG. 28 shows the conference room wherein people are diagrammatically depicted. The CRC comprises a conference table 2802 and seating. Furthermore, the diagram shows that the units 2801, 2803 and 3002 are folded up in order to create available space.

Figures 29A, 29B:
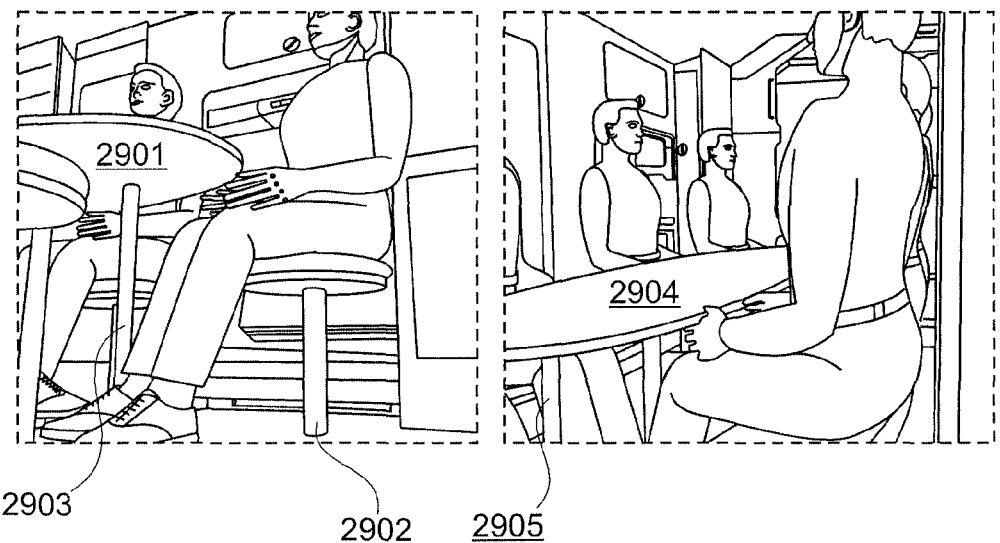
FIGS. 29a-29b: a boot-level view (see FIG. 29a) and a lateral view (FIG. 29b) of a crew rest compartment for use as a conference room with diagrammatically indicated people.

FIG. 29a shows a boot-level perspective of the same room, wherein the legs 2903 of the table 2901 and the leg 2902 of the stool are shown. The table legs 2903 and the leg 2902 of the stool can be of a telescopic design, whereby after use the conference table and the stools can be moved in the direction of the floor of the CRC. In this way re-conversion for use by the crew can be facilitated.

FIG. 29b shows the conference table with a table leg 2905 that can be telescopic in design.

Figure 30:
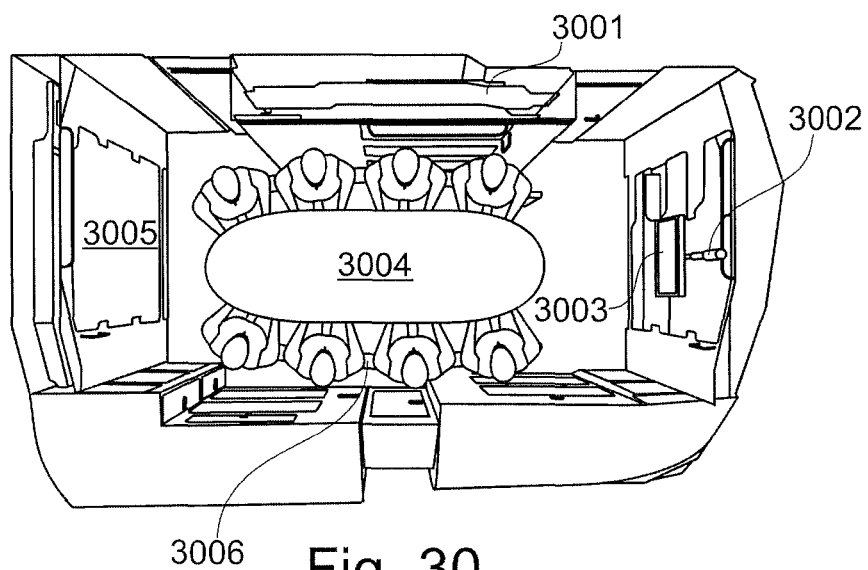
FIG. 30: a bird's eye view of a crew rest compartment for use as a conference room with diagrammatically indicated people.

FIG. 30 shows the conference room with a conference table 3004, anti-fatigue stand-up devices 3006 and a monitor 3003 that is attached to a telescopic arm 3002. Units 3005, 3001 and 3002 are folded.

Figure 31A:
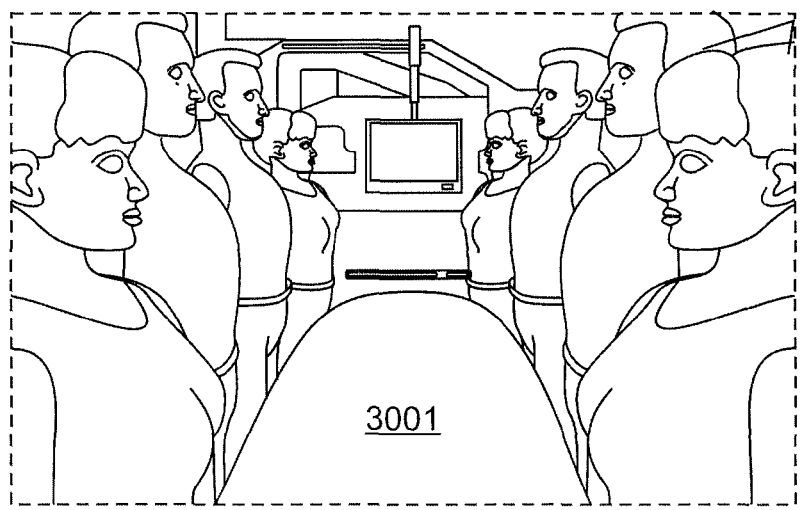
FIGS. 31a-31c: a crew rest compartment for use as a conference room with diagrammatically indicated people, from a lateral perspective view (see FIG. 31a), from a boot-level view (see FIGS. 31b and 31c)

FIG. 31a shows a further perspective of the conference room along the conference table 3101.

Figures 31B, 31C:
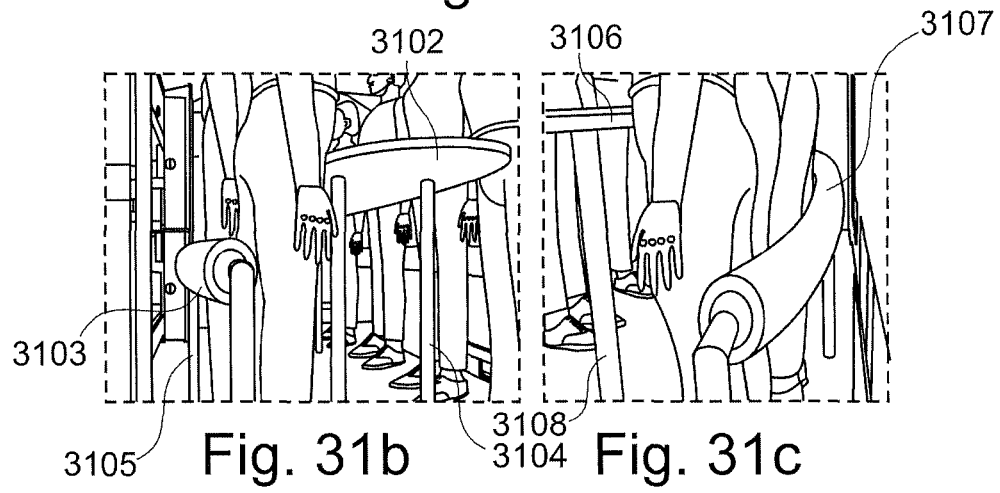

FIG. 31b shows a boot-level perspective of the conference room with an anti-fatigue stand-up device 3103 and a table 3102 as well as a table leg 3104. The table leg can be telescopic in design so as to ensure retractability of the conference table 3102 after use. The anti-fatigue stand-up device 3103 is attached to columns 3105 that are telescopic in design, whereby retractability can be ensured.

FIG. 31c in a further boot-level perspective shows the anti-fatigue stand-up device 3107 and the conference table 3106 with a table leg 3108.

Figure 32:
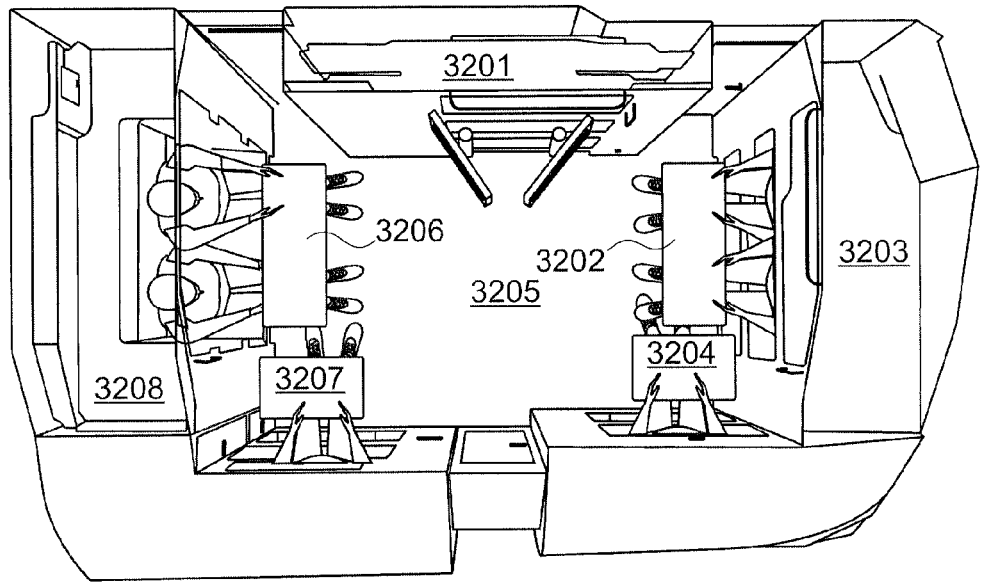
FIG. 32: a bird's eye view of a crew rest compartment for use as a conference room with diagrammatically indicated people.

FIG. 32 shows the CRC converted to an entertainment room, for example for cinema events or as a meeting room or conference room. In this arrangement passengers are seated at tables 3206, 3207, 3204 and 3202 within units 3208, 3203. The available space 3205 of the CRC has only been enlarged by folding up unit 3201 in order to make room for monitors. Furthermore, a projection screen can be provided.

Figure 33A:
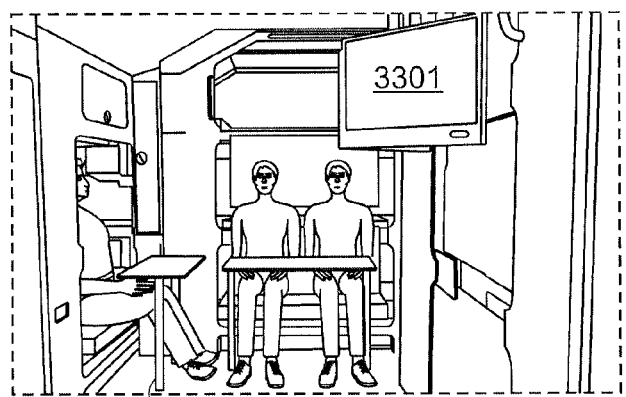
FIGS. 33a-33b: a lateral perspective view of a crew rest compartment for use as a conference room with diagrammatically indicated people.

FIG. 33a shows a perspective view of the CRC with a monitor 3301 and tables with table legs 3302, wherein the table legs can be telescopic in design.

Figure 33B:
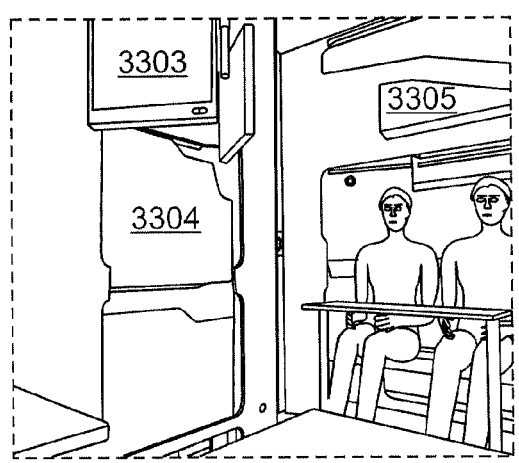

FIG. 33b shows a further perspective view with a folded-up unit 3304 in order to create space for monitors 3303. The front panel 3305 of a further unit is not offset, so that passengers can be seated in the corresponding seats.

The use of the CRC as a recreation room for passengers represents a further embodiment of the invention, wherein an opportunity is offered to pass the time with gambling. With various tabletop arrangements it is possible to play poker, roulette or blackjack on the gaming table. Furthermore, slot machines can be provided that can offer a player a selection of various games. This concept would be a further source of revenue for airlines.

Figure 34:
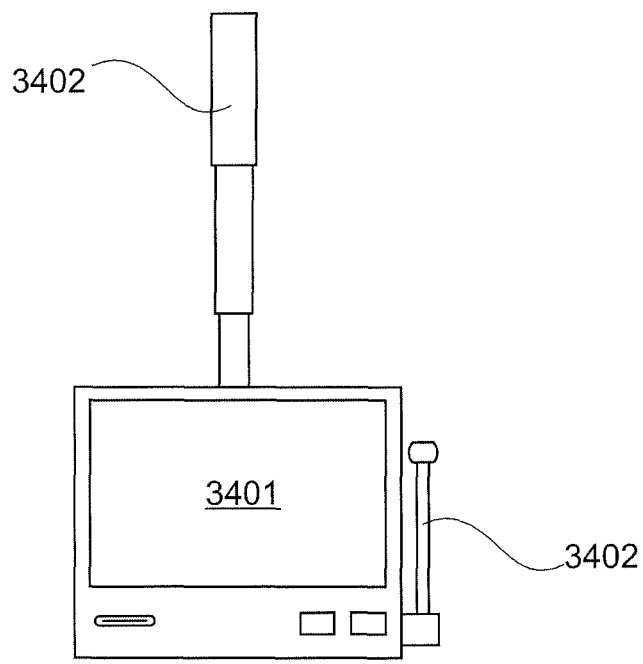
FIG. 34: a slot machine.

FIG. 34 shows a slot machine 3401 comprising a lever 3402 and a telescopic arm 3402. By means of the telescopic arm 3402 the slot machine can be displaced after use in order to create space for the crew.

Figure 35:
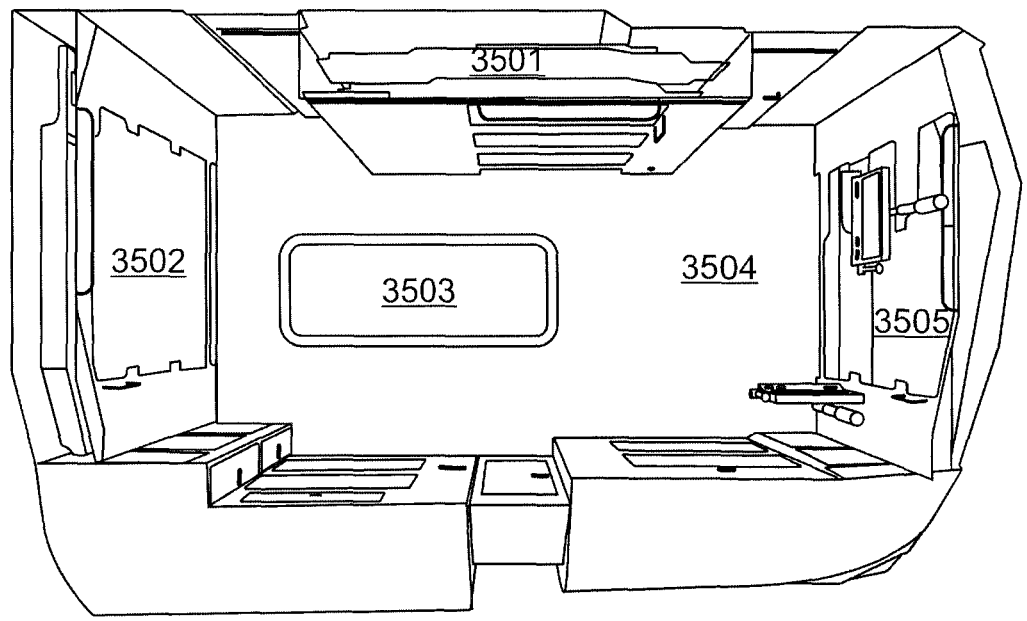
FIG. 35: a bird's eye view of a crew rest compartment for use as a gambling room.

FIG. 35 shows the CRC in a configuration that makes it possible for passengers to engage in gambling. To this effect the CRC comprises a universal gaming table 3503. The units 3501, 3502 and 3505 are arranged in a space-saving manner, whereby the available space 3504 is enlarged.

Figure 36:
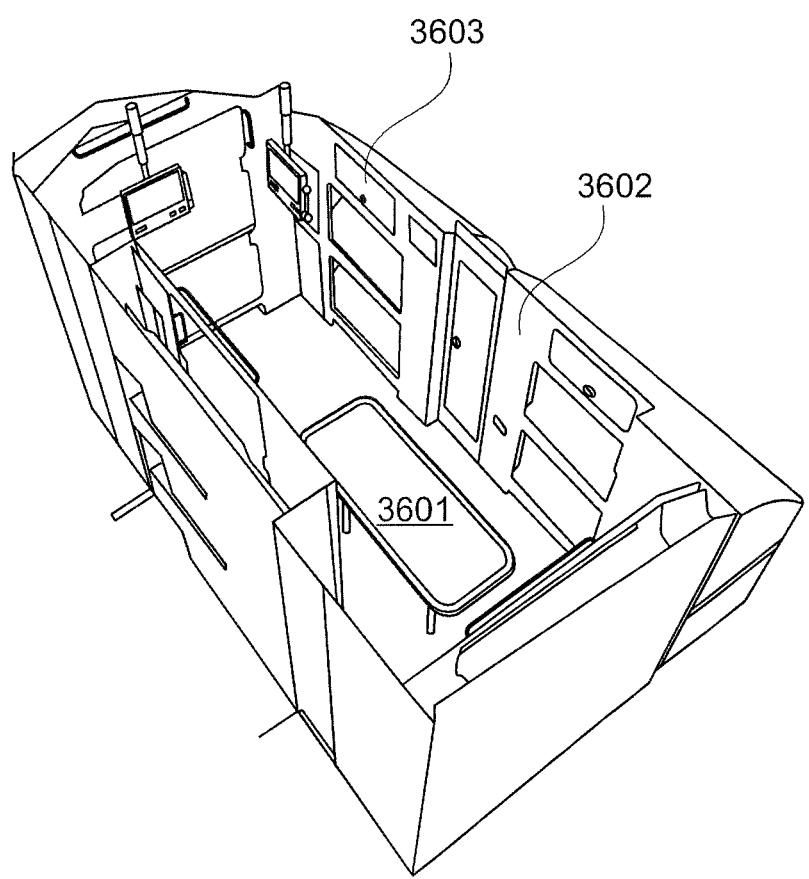
FIG. 36: a bird's eye view of a crew rest compartment for use as a gambling room.

FIG. 36 shows a perspective top view of the same space with the universal gaming table 3601. Units 3603 and 3602 are folded up in a space-saving manner.

Figure 37:
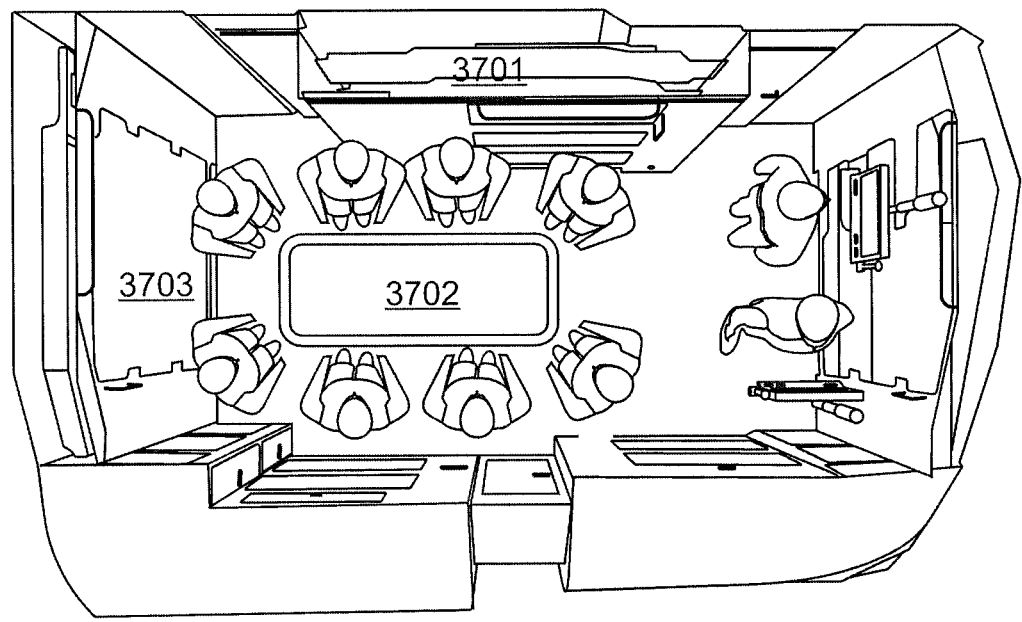
FIG. 37: a bird's eye view of a crew rest compartment for use as a gambling room with diagrammatically indicated people.

FIG. 37 shows the gaming room with people being diagrammatically shown in order to provide an idea of the spatial conditions. The centre of the room comprises a universal gaming table 3702. Units 3701 and 3703 are folded.

Figure 38:
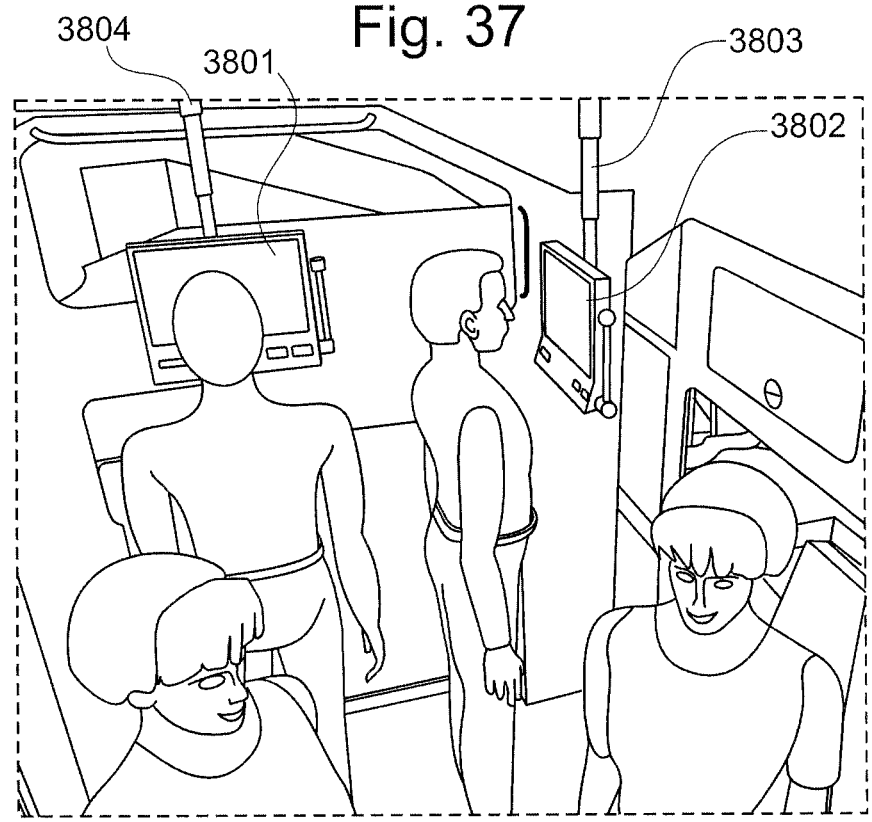
FIG. 38: a bird's eye view of a crew rest compartment for use as a gambling room with diagrammatically indicated people.

FIG. 38 shows a perspective view of the same space with two slot machines 3801 and 3802 which are attached to telescopic arms 3804 and 3803.

A further embodiment of the invention makes it possible for passengers to engage in sports activities in the CRC. To this effect treadmills and exercise bicycles or, for example, also an interactive video game can be used.

Figure 39:
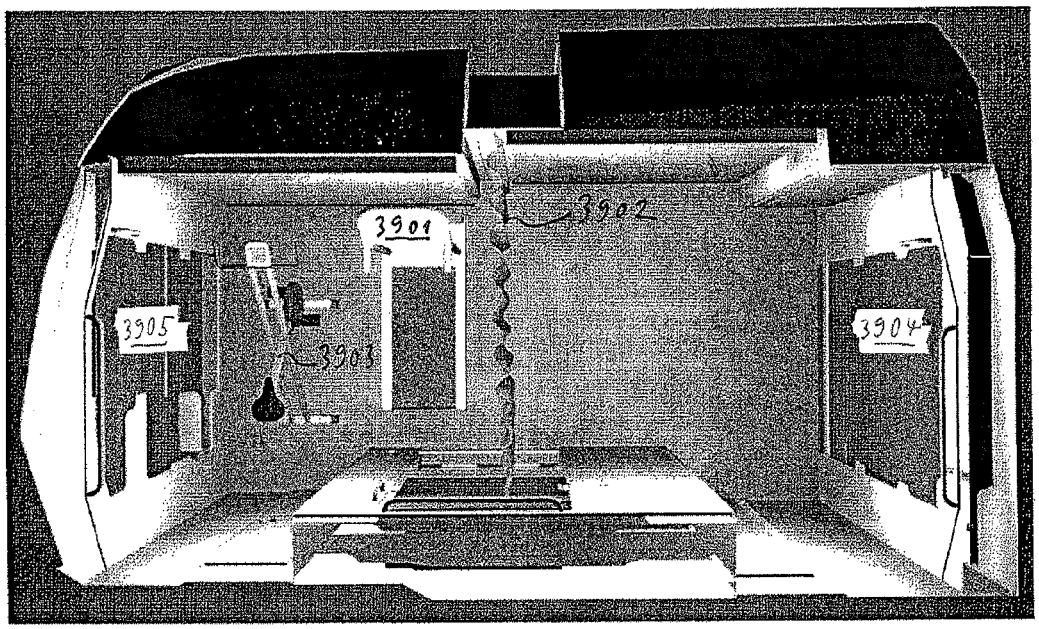
FIG. 39: a bird's eye view of a crew rest compartment for use as a fitness studio.

FIG. 39 shows a CRC that has been converted to a fitness studio with a treadmill 3901 and an exercise bicycle 3903. Units 3905 and 3904 are folded, whereby the available space in the CRC has been increased. This space has been divided by means of a curtain 3902 as a room divider in order to allow optimum use of the space. Furthermore, roll-out projection screens can be provided for displaying the interactive video games and for displaying videos/films during various activities.

Figure 40:
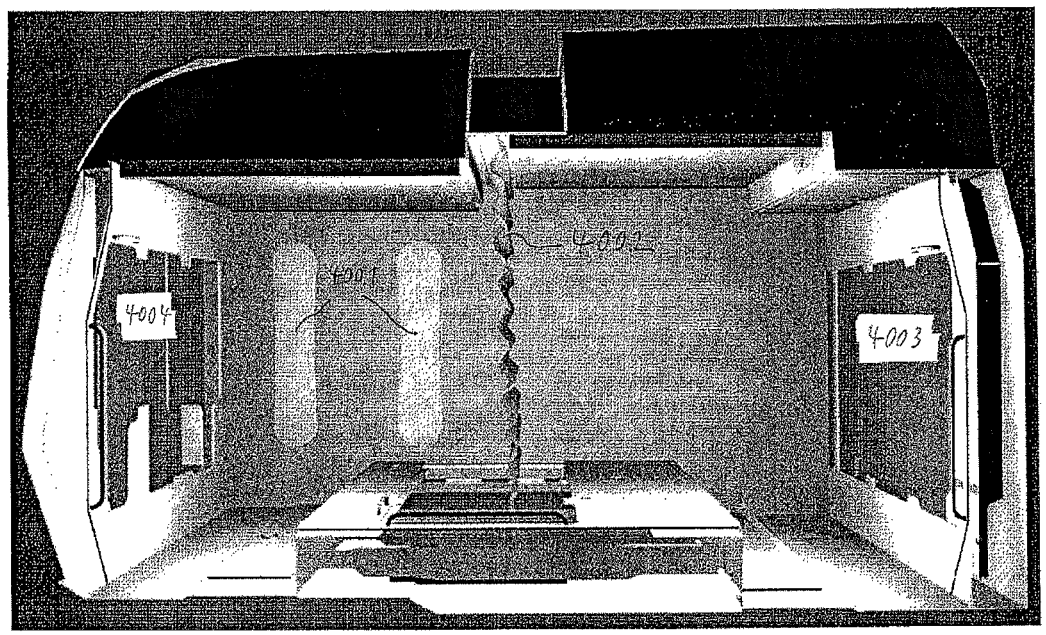
FIG. 40: a bird's eye view of a crew rest compartment for use as a fitness studio.

FIG. 40 shows the CRC as a fitness studio with two snowboards 4001. The available space, which has been increased by folding up the units 4004 and 4003, is divided by means of a curtain 4002 as a room divider.

Figure 41:
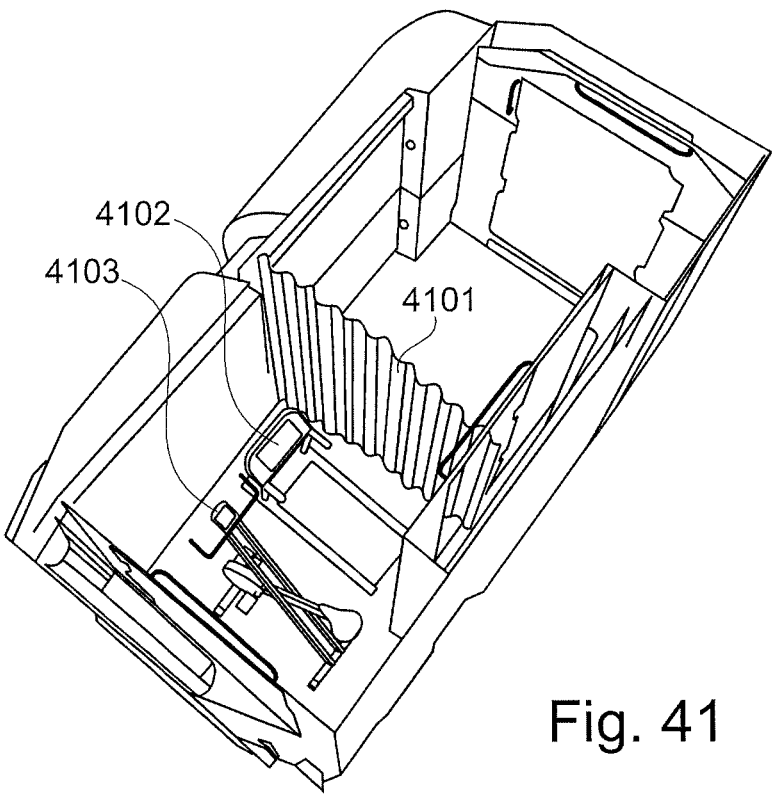
FIG. 41: a bird's eye view of a crew rest compartment for use as a fitness studio.

FIG. 41 shows a perspective top view of the CRC as a fitness studio with a treadmill 4102, an exercise bicycle 4103 and a curtain 4101 as a room divider.

Figure 42:
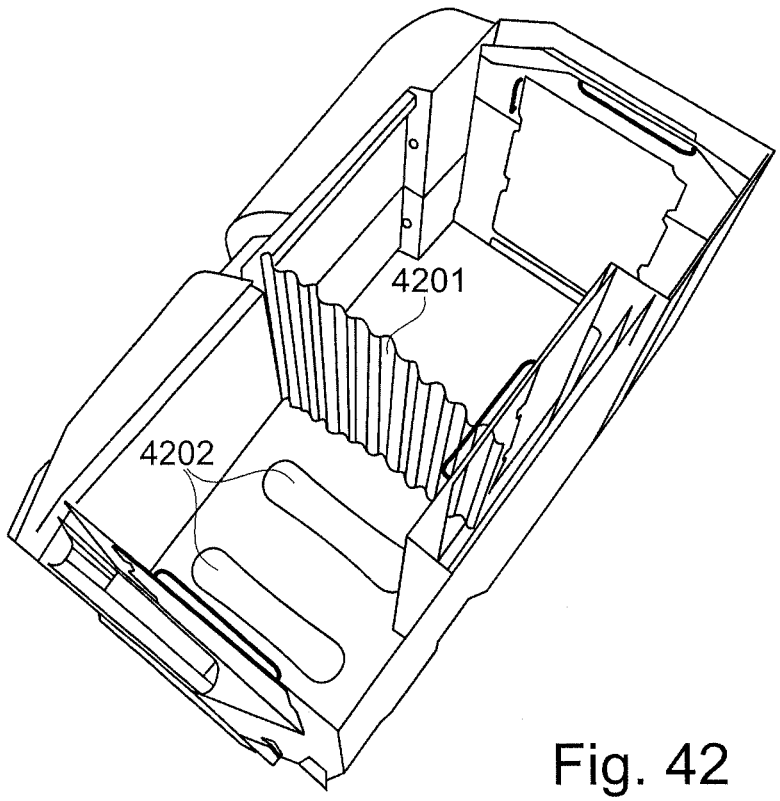
FIG. 42: a bird's eye view of a crew rest compartment for use as a fitness studio.

FIG. 42 shows a perspective top view of the CRC with two snowboards 4202 and a curtain 4201 as a room divider.

Figure 43:
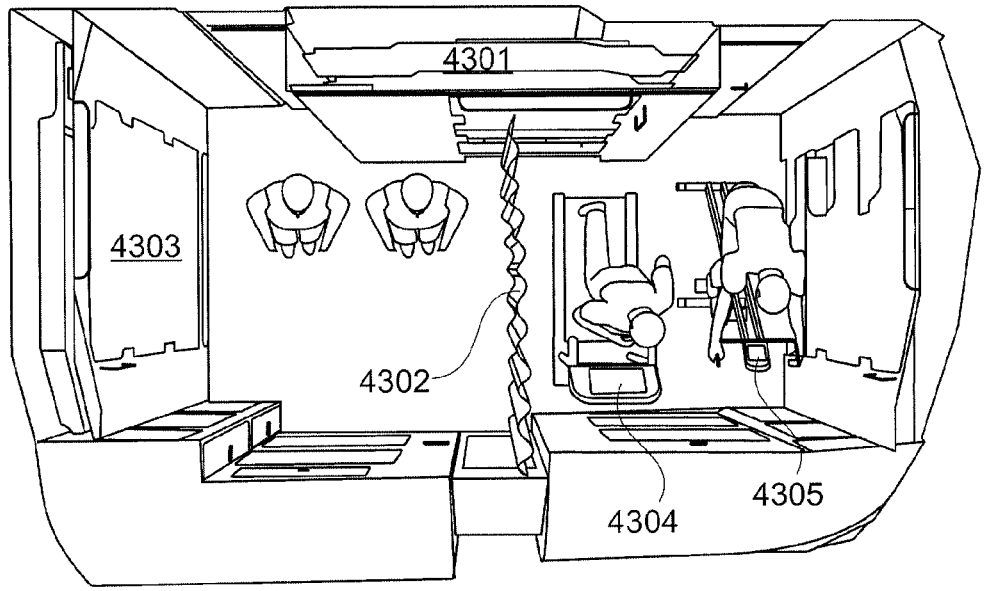
FIG. 43: a bird's eye view of a crew rest compartment for use as a fitness studio with diagrammatically indicated people.

FIG. 43 shows a perspective top view of the CRC with the units 4301 and 4303 folded up. For sports activities, passengers can be offered a treadmill 4304 and an exercise bicycle 4305. Furthermore, a second region of the CRC can be separated by a curtain 4302 as a room divider, in which room electronically simulated games, e.g. in the form of an interactive video game, can be played.

Figure 44:
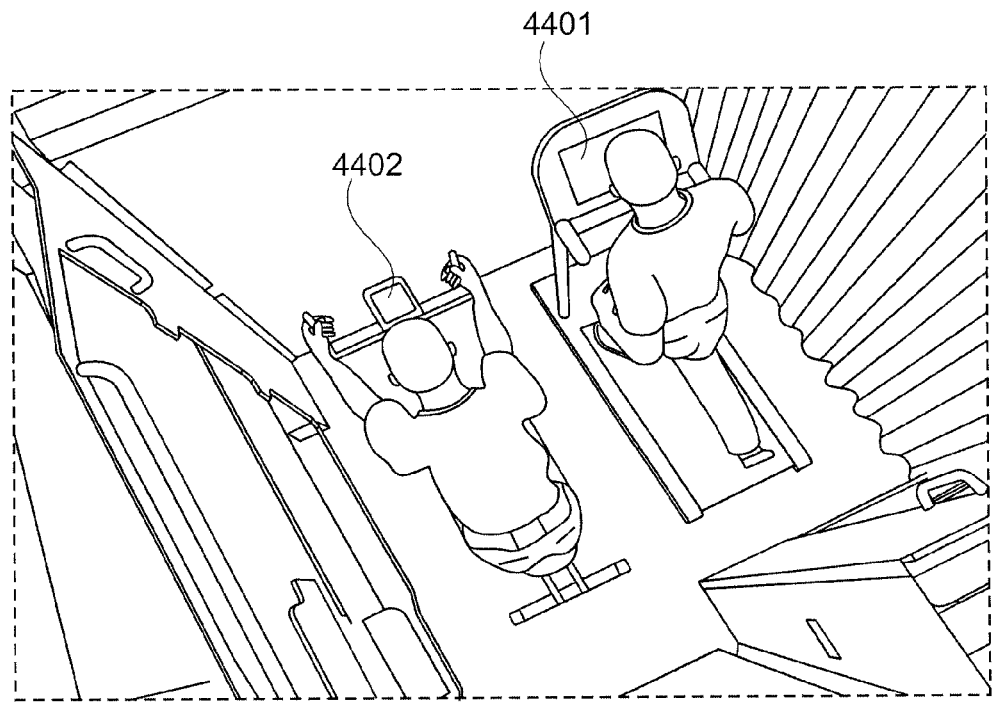
FIG. 44: a bird's eye view of a crew rest compartment for use as a fitness studio with diagrammatically indicated people.

FIG. 44 shows a top view of part of the CRC with a treadmill 4401 and an exercise bicycle 4402.

Figure 45:
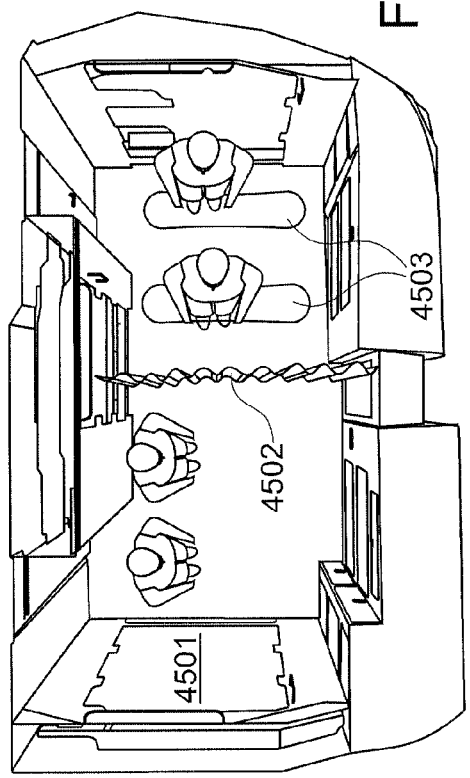
FIG. 45: a bird's eye view of a crew rest compartment for use as a fitness studio with diagrammatically indicated people.

FIG. 45 shows a CRC that is equipped as a fitness studio with folded-up units 4501, a curtain 4502 and two snowboards 4503.

Figure 46:
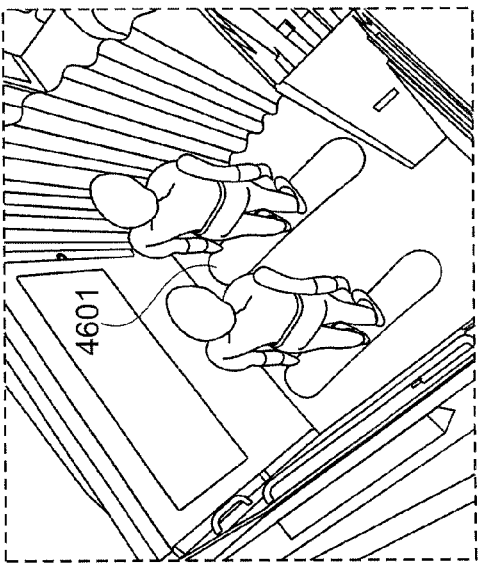
FIG. 46: a bird's eye view of a crew rest compartment for use as a fitness studio with diagrammatically indicated people.

FIG. 46 shows a top view of part of the CRC with two snowboards 4601.

Figure 47:
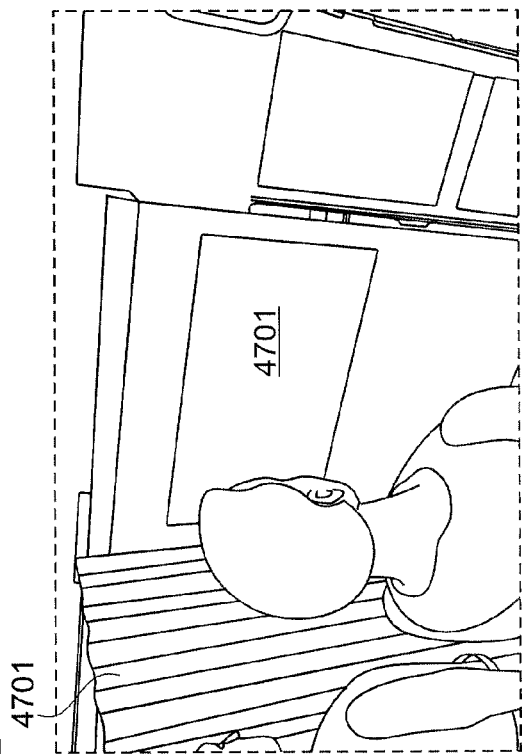
FIG. 47: a bird's eye view of a crew rest compartment for use as a fitness studio with diagrammatically indicated people.

FIG. 47 shows a top view of a second part of the CRC, wherein the region is shown in which electronically animated games can be played. In this arrangement the wall 4702 can, for example, be used to show the events of the game that is being generated by a projector. The room is divided from the remaining CRC by a curtain 4701.

The additional equipment required for multiple use needs to be stowed away in a space-saving way in the aircraft during the time it is not required. Tables can therefore comprise folding legs. Furthermore, the tables can be designed so as to be able to be stowed away within the floor. Monitors and slot machines can be attached to the ceiling by way of a telescopic arm, whereby they can be folded down from the ceiling if necessary. Smaller objects such as the tabletop arrangements for poker, back- and neck massage apparatus or massage mats can be accommodated in the stowage compartments within the units. In the case of treadmills, the running area can be designed so as to be integrated in the floor.

In all the concepts with multiple use the requirements of air conditioning must be ensured as the most important point. In these arrangements an adequate number of accessible oxygen containers and oxygen masks for the maximum number of people who may be present in the CRC must be ensured.

The alternative use of CRCs results in advantages, such as an additional source of revenue by airlines by paid use of the facilities installed in the CRC. Equipping CRC with sports equipment (treadmill, fitness devices, ergometers etc.) leads to preventative health measures. Furthermore, cultural and social meeting points are created in the aircraft, which meeting points make flying more entertaining. Moreover, long journeys can be used sensibly, for example by convening conferences.

It should be noted that the term "comprising" does not exclude other elements or process-related steps, and that the term "a" or "one" does not exclude several elements or steps.

The reference characters used serve only to provide a better understanding and should in no way be interpreted as limiting, wherein the scope of protection of the invention is defined by the claims.

LIST OF REFERENCE CHARACTERS

101 Unit
102 Unit
103 Unit
104 Unit
105 Unit
106 Stowage cabinet
107 Door
108 Stowage cabinet
109 Stowage compartment
110 Partition wall
201 Wall
202 Side
203 Bed
204 Arrow
205 Arrow
206 Arrow
207 Front panel
208 Wall
209 Bed
210 Bed
211 Bed
212 Ceiling
213 Bottom
301 Rear
302 Ceiling
303 Bed
304 Front panel
305 Bottom
306 Bed
307 Rear
308 Board
309 Board
401 Rear
402 Ceiling
403 Bed
404 Front panel
405 Bottom
406 Bed
407 Front panel
408 Front panel
409 Rear
410 Arrow
411 Sidewall
412 Sidewall
501 Rear
502 Ceiling
503 Front panel
504 Bed
505 Bottom
506 Front panel
507 Arrow
508 Bed
509 Bed with front panel
601 Rear
602 Ceiling
603 Front panel
604 Bed
605 Bottom
606 Front panel
607 Arrow
608 Bed
609 Bed
701 Bed
702 Bed
703 Rear
704 Sidewall
705 Sidewall
706 Front panel
707 Bed
801 Bed
802 Bed
803 Front panel
804 Bed
805 Sidewall
806 Sidewall
807 Arrow
901 Rear
902 Ceiling
903 Front panel
904 Bed
905 Bottom
906 Bed
907 Rear
908 Arrow
909 Arrow
910 Front panel
911 Sidewall
1001 Rear
1002 Ceiling
1003 Front panel
1004 Bed
1005 Bed
1006 Front panel
1007 Bottom
1008 Sidewall
1009 Articulation
1010 Articulation
1011 Articulation
1101 Sidewall
1102 Recess
1103 Recess 1104 Front panel
1105 Region
1106 Storage space
1107 Region
1108 Region
1201 Bed
1202 Front panel
1203 Bed
1204 Bed
1205 Front panel
1206 Storage space
1207 Unit
1208 Unit
1209 Sidewall
1210 Sidewall
1301 Bed
1302 Front panel
1303 Bed
1304 Front panel
1305 Sidewall
1306 Sidewall
1307 Supply duct
1308 Region
1309 Storage space
1310 Supply duct
1311 Region
1401 Unit
1402 Unit
1403 Unit
1404 Available space
1405 Unit
1406 Unit
1407 Available space
1408 Unit
1409 Unit
1410 Unit
1411 Unit
1412 Unit
1501 Unit
1502 Unit
1503 Unit
1504 Available space
1505 Unit
1506 Unit
1601 Unit
1602 Unit
1603 Unit
1604 Unit
1605 Unit
1701 Unit
1702 Unit
1703 Unit
1704 Calf massage apparatus
1705 Back massage apparatus
1706 Calf massage apparatus
1707 Neck massage apparatus
1801 Back massage apparatus
1802 Calf massage apparatus
1803 Massage mat
1804 Neck massage apparatus
1901 Unit
1902 Calf massage apparatus
2001 Neck massage apparatus
2002 Calf massage apparatus
2003 Front panel
2004 Protrusion
2101 Massage mat
2102 Massage mat
2103 Available space
2104 Unit
2201 Unit
2202 Bench
2203 Conference table
2204 Stool
2205 Monitor
2206 Arm
2207 Unit
2208 Unit
2301 Unit
2302 Arm
2303 Monitor
2304 Unit
2305 Conference table
2306 Anti-fatigue stand-up device
2307 Unit
2401 Bench
2402 Conference table
2403 Stool
2404 Unit
2501 Unit
2502 Conference table
2503 Anti-fatigue stand-up device
2601 Unit
2602 Table
2603 Unit
2604 Table
2605 Available space
2606 Unit
2607 Table
2608 Table
2701 Table
2702 Table
2703 Monitor
2704 Monitor
2705 Unit
2801 Unit
2802 Conference table
2803 Unit
2901 Conference table
2902 Chair leg
2903 Table leg
2904 Conference table
2905 Table leg
3001 Unit
3002 Arm
3003 Monitor
3004 Conference table
3005 Unit
3006 Anti-fatigue stand-up device
3101 Conference table
3102 Conference table
3103 Anti-fatigue stand-up device
3104 Table leg
3105 Column
3106 Conference table
3107 Anti-fatigue stand-up device
3108 Table leg
3201 Unit
3202 Table
3203 Unit
3204 Table
3205 Available space
3206 Table
3207 Table 3208 Unit
3301 Monitor
3302 Table leg
3303 Monitor
3304 Unit
3305 Unit
3401 Slot machine
3402 Lever
3403 Arm
3501 Unit
3502 Unit
3503 Universal gaming table
3504 Available space
3505 Unit
3601 Universal gaming table
3602 Unit
3603 Unit
3701 Unit
3702 Universal gaming table
3703 Unit
3801 Slot machine
3802 Slot machine
3803 Arm
3804 Arm
3901 Treadmill
3902 Curtain
3903 Exercise bicycle
3904 Unit
3905 Unit
4001 Snowboard
4002 Curtain
4003 Unit
4004 Unit
4101 Curtain
4102 Treadmill
4103 Exercise bicycle
4201 Curtain
4202 Snowboard
4301 Unit
4302 Curtain
4303 Unit
4304 Treadmill
4305 Exercise bicycle
4401 Treadmill
4402 Exercise bicycle
4501 Unit
4502 Curtain
4503 Snowboard
4601 Snowboard
4701 Curtain
4702 Wall

The invention claimed is:

1. A crew rest compartment for accommodating at least one member of a crew of an aircraft, wherein the crew rest compartment is configured to be arranged in an aircraft, the crew rest compartment comprising:
a unit for accommodating at least one member of a crew of an aircraft, wherein the unit is arranged in the crew rest compartment, and comprises first means and second means for changing the space required for the unit, wherein the unit comprises:
a front portion;
a rear portion;
a floor;
a ceiling;
a front panel; and
a first and a second lying-down facility arranged one above the other, each having a first side region, a second side region opposite to the first side region, and a longitudinal extension parallel to a surface of the rear portion of the unit such that the first side region of each lying-down facility faces the rear portion of the unit and the second side region faces the front portion of the unit, wherein the first and second lying-down facilities comprise means for displacing each of the lying-down facilities towards the rear portion of the unit, from a horizontal position to a stowed position;
wherein the front panel, positioned at the front portion of the unit, comprises a first and a second opening arranged one above the other and is configured to allow a crew member to enter at least one of the first lying-down facility and the second lying-down facility, respectively, from a region of the crew rest compartment which region is outside the unit;
wherein the front panel is configured for fastening the first and second lying-down facilities in the horizontal position; and
wherein the front panel comprises means for translationally sliding the front panel towards the first and second lying-down facilities and towards the rear portion of the unit when the first and second lying-down facilities have been displaced into the stowed position.

2. The crew rest compartment of claim 1, wherein the means for displacing the lying-down facility is disposed within the unit.

3. The crew rest compartment according to claim 1, wherein each of the first and second lying-down facilities comprises means for converting the respective lying-down facility from a substantially horizontal alignment to a substantially vertical alignment.

4. The crew rest compartment according to claim 1, wherein the front panel comprises means for folding up the front panel.

5. The crew rest compartment according to claim 1, wherein the unit comprises third means for changing the space required for the unit, wherein the unit comprises a sidewall comprising means for displacing the sidewall.

6. The crew rest compartment of claim 5, wherein the sidewall comprises means for rotating the sidewall on an axis.

7. The crew rest compartment of claim 5, wherein the sidewall comprises means for folding up the sidewall.

8. The crew rest compartment according to claim 1, further comprising
a storage space comprising means for displacing the storage space.

9. The crew rest compartment according to claim 1, further comprising
a monitor comprising means for displacing the monitor.

10. The crew rest compartment of claim 9, wherein the means for displacing the monitor comprise a telescopic arm.

11. An aircraft comprising the crew rest compartment, wherein the crew rest compartment is configured to be arranged in an aircraft, the crew rest compartment comprising:
a unit for accommodating at least one member of a crew of an aircraft, wherein the unit is arranged in the crew rest compartment, and comprises first means and second means for changing the space required for the unit, wherein the unit comprises:
a front portion;
a rear portion;
a floor;
a ceiling;

a front panel; and a first and a second lying-down facility one above the other, each having a first side region, a second side region opposite to the first side region, and a longitudinal extension parallel to a surface of the rear portion of the unit such that the first side region of each lying-down facility faces the rear portion of the unit and the second side region faces the front portion of the unit, wherein the first and second lying-down facilities comprise means for displacing each of the lying-down facilities towards the rear portion of the unit, from a horizontal position to a stowed position;

wherein the front panel, positioned at the front portion of the unit, comprises a first and a second opening arranged one above the other and is configured to allow a crew member to enter at least one of the first lying-down facility and the second lying-down facility, respectively, from a region of the crew rest compartment which region is outside the unit;

wherein the front panel is configured for fastening the first and second lying-down facilities in the horizontal position; and wherein the front panel comprises means for translationally sliding the front panel towards the first and second lying-down facilities and towards the rear portion of the unit when the first and second lying-down facilities have been displaced into the stowed position.

12. The crew rest compartment of claim 1, wherein the front panel comprises a flat surface in which the first and second openings are defined.

13. The aircraft of claim 11, wherein the front panel comprises a flat surface in which the first and second openings are defined.

* * * * *